United States Patent
Mizutani et al.

(10) Patent No.: US 8,334,069 B2
(45) Date of Patent: Dec. 18, 2012

(54) ANODE ACTIVE MATERIAL AND SECONDARY BATTERY

(75) Inventors: Satoshi Mizutani, Fukushima (JP); Hiroshi Inoue, Fukushima (JP)

(73) Assignee: Sony Corporation, Tokyo (JP)

( * ) Notice: Subject to any disclaimer, the term of this patent is extended or adjusted under 35 U.S.C. 154(b) by 695 days.

(21) Appl. No.: 12/489,020

(22) Filed: Jun. 22, 2009

(65) Prior Publication Data
US 2009/0317716 A1 Dec. 24, 2009

(30) Foreign Application Priority Data
Jun. 23, 2008 (JP) .................................. 2008-162754

(51) Int. Cl.
*H01M 6/04* (2006.01)
(52) U.S. Cl. ................. 429/200; 429/218.1; 429/231.95
(58) Field of Classification Search .................. 429/200, 429/218.1, 231.95
See application file for complete search history.

(56) References Cited

U.S. PATENT DOCUMENTS

| | | | |
|---|---|---|---|
| 4,950,566 A | 8/1990 | Huggins et al. | |
| 6,730,434 B1 | 5/2004 | Kawakami et al. | |
| 2004/0234859 A1 | 11/2004 | Lee et al. | |
| 2005/0175901 A1 | 8/2005 | Kawakami et al. | |

FOREIGN PATENT DOCUMENTS

| | | |
|---|---|---|
| JP | 08-315825 | 11/1996 |
| JP | 2000-311681 | 11/2000 |
| JP | 2004-349253 | 12/2004 |
| WO | 00/17949 | 3/2000 |

OTHER PUBLICATIONS

Ou Mao and J. R. Dahn; Mechanically Alloyed Sn-Fe(-C) Powders as Anode Materials for Li-Ion Batteries; Journal of the Electrochemical Society; 146 (2) 414-422 (1999).
Hansu Kim et al.; The Insertion Mechanism of Lithium into Mg2Si Anode Material for Li-Ion Batteries; Journal of the Electrochemical Society; 146 (12) 4401-4405 (1999).

*Primary Examiner* — Edward Cain
(74) *Attorney, Agent, or Firm* — SNR Denton US LLP

(57) ABSTRACT

A secondary battery includes a cathode, an anode, and an electrolyte. The anode includes an anode active material containing silicon, boron, carbon, and one or more of metal elements selected from the group consisting of cobalt, titanium and iron. In the anode active material, a boron content is from 4.9 mass % to 19.8 mass % both inclusive, a carbon content is from 4.9 mass % to 19.8 mass % both inclusive, a total of the boron content and the carbon content is from 9.8 mass % to 29.8 mass % both inclusive, a ratio of a silicon content to the total of the silicon content and a content of the metal element is from 70 mass % to 95 mass % both inclusive. A reaction phase whose half-width of a diffraction peak obtained by X-ray diffraction is 1 degree or more is included and the anode active material is capable of reacting with an electrode reactant.

6 Claims, 17 Drawing Sheets

ANODE ACTIVE MATERIAL AND SECONDARY BATTERY

BACKGROUND OF THE INVENTION

1. Field of the Invention

The present invention relates to an anode active material containing silicon as an element and a secondary battery including the anode active material.

2. Description of the Related Art

In recent years, many portable electronic devices such as camcorders, mobile phones, and notebook personal computers have been introduced, and their size and weight have been reduced. Since a battery used as a portable power source for these electronic devices, in particular a secondary battery is important as a key device, research and development to improve the energy density has been actively promoted. Specially, a nonaqueous electrolyte secondary battery (for example, lithium ion secondary battery) provides a higher energy density compared to a lead battery and a nickel cadmium battery as an existing aqueous electrolytic solution secondary battery. Thus, studies of improving such a nonaqueous electrolyte secondary battery have been made in various fields.

In the lithium ion secondary battery, as an anode active material, a carbon material such as non-graphitizable carbon and graphite that shows the relatively high capacity and has the favorable cycle characteristics has been widely used. However, since a higher capacity has been demanded in recent years, the capacity of the carbon material should be further improved.

Against such a background, techniques to retain a high capacity with the use of the carbon material by selecting the carbonized raw material and the forming conditions have been developed as disclosed in, for example, Japanese Unexamined Patent Application Publication No. 8-315825. However, in the case of using such a carbon material, the anode discharge potential is from 0.8 V to 1.0 V both inclusive to lithium, and the battery discharge voltage is lowered when the battery is fabricated. Thus, in this case, it is not possible to expect great improvement in the battery energy density. Further, in this case, there is a disadvantage that the hysteresis is large in the charge and discharge curved line shape, and the energy efficiency in each charge and discharge cycle is low.

Meanwhile, as an anode with the higher capacity than that of the carbon material, researches on an alloy material have been promoted. In such an alloy material, a certain type of metal is electrochemically alloyed with lithium, and the resultant alloy is reversibly generated and decomposed. For example, a high capacity anode using Li—Al alloy or Sn alloy has been developed. In addition, a high capacity anode made of Si alloy has been developed as disclosed in, for example, U.S. Pat. No. 4,950,566.

However, the Li—Al alloy, the Sn alloy, or Si alloy is expanded and shrunk due to charge and discharge, the anode is pulverized every time charge and discharge are repeated, and thus the cycle characteristics are extremely poor.

Thus, as a technique to improve the cycle characteristics, studies on suppressing expansion by alloying tin or silicon have been made. For example, it has been proposed to alloy iron and tin as disclosed in, for example, "Journal of the Electrochemical Society," 1999, No. 146, p. 414. Further, $Mg_2Si$ or the like has been proposed as disclosed in, for example, "Journal of the Electrochemical Society," 1999, No. 146, p. 4401. Furthermore, for example, Sn•A•X (A represents at least one of transition metals and X represents at least one selected from the group consisting of carbon and the like) in which the ratio Sn/(Sn+A+V) is from 20 atomic % to 80 atomic % both inclusive has been proposed as disclosed in, for example, Japanese Unexamined Patent Application Publication No. 2000-311681.

SUMMARY OF THE INVENTION

However, even when the foregoing technique is used, in the present circumstances, the effects of improving the cycle characteristics are not sufficient, and the advantages of the high capacity anode using the alloy material are not sufficiently used. Thus, a technique to further improve the cycle characteristics has been sought.

In the present invention, it is desirable to provide a secondary battery having high capacity and superior cycle characteristics and an anode active material used for the secondary battery.

According to an embodiment of the present invention, there is provided an anode active material containing silicon, boron, carbon, and one or more of metal elements selected from the group consisting of cobalt, titanium and iron, as an element, in which a boron content is from 4.9 mass % to 19.8 mass % both inclusive, a carbon content is from 4.9 mass % to 19.8 mass % both inclusive, a total of the boron content and the carbon content is from 9.8 mass % to 29.8 mass % both inclusive, a ratio of a silicon content to the total of the silicon content and a content of metal element is from 70 mass % to 95 mass % both inclusive, and a reaction phase whose half-width of a diffraction peak obtained by X-ray diffraction is 1 degree or more is included, and the anode active material is capable of reacting with an electrode reactant.

According to an embodiment of the present invention, there is provided a secondary battery including a cathode, an anode and an electrolyte. The anode includes the anode active material of the embodiment of the present invention.

According to the anode active material of the embodiment of the present invention, silicon is contained as an element. Therefore, the high capacity is obtainable. Further, one or more of the metal elements selected from the group consisting of cobalt, titanium and iron is contained, and the ratio of the silicon content to the total of the silicon content and the content of the metal element is from 70 mass % to 95 mass % both inclusive. Therefore, the cycle characteristics are improved while maintaining the high capacity. Furthermore, born and carbon are contained as an element, and the boron content is from 4.9 mass % to 19.8 mass % both inclusive, the carbon content is from 4.9 mass % to 19.8 mass % both inclusive, the total of the boron content and the carbon content is 9.8 mass % to 29.8 mass % both inclusive. Therefore, the cycle characteristics are further improved. Moreover, the anode active material of the embodiment of the present invention includes the reaction phase whose half-width of the diffraction peak obtained by X-ray diffraction is 1 degree or more and is capable of reacting with the electrode reactant. Therefore, the electrode reactant or the like is smoothly inserted and extracted and in the case of being used for the secondary battery, the reactivity with the electrolyte is reduced. Thus, according to the secondary battery of the embodiment of the present invention using the foregoing anode active material, the high capacity is obtainable and the superior cycle characteristics are obtainable.

Other and further objects, features and advantages of the invention will appear more fully from the following description.

DETAILED DESCRIPTION OF THE PREFERRED EMBODIMENT

Figure 1:
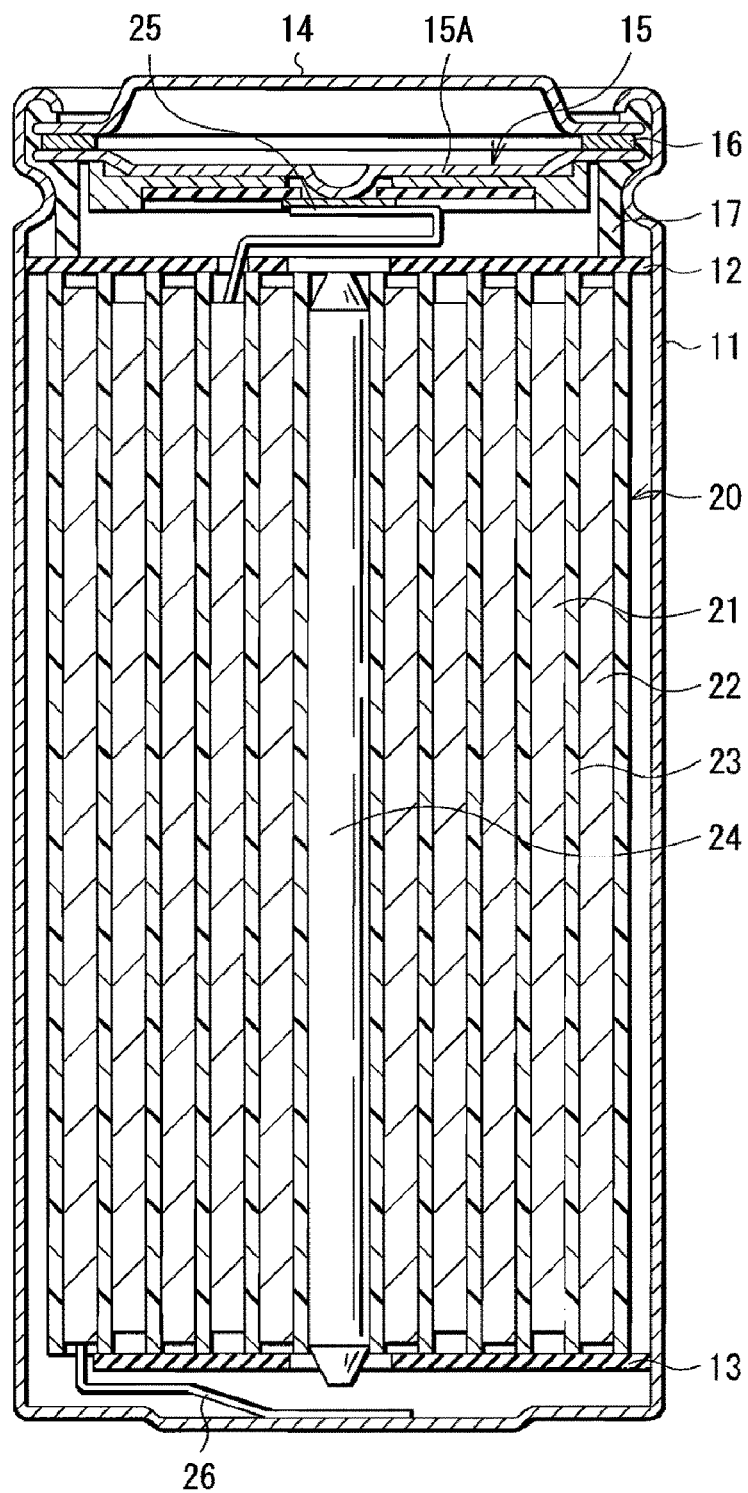
FIG. 1 is a cross sectional view illustrating a structure of a first secondary battery according to an embodiment of the invention.

An embodiment of the invention will be hereinafter described in detail with reference to the drawings.

The anode active material of the embodiment of the invention is used for an electrochemical device such as a secondary battery, for example. The anode active material is capable of reacting with the electrode reactant such as lithium and contains silicon and one or more of the metal elements selected from the group consisting of cobalt, titanium and iron, as an element. Silicon has high reacting dose of the electrode reactant per unit mass, thereby the high capacity is obtainable. Further, although it is difficult to obtain sufficient cycle characteristics with simple substance of silicon, when the metal element such as cobalt is contained, the cycle characteristics are improved.

For the content of metal element, the ratio of silicon content to the total of the silicon content and the content of the metal element is preferably in the range from 70 mass % to 95 mass % both inclusive, and more preferably in the range from 80 mass % to 90 mass %. If the ratio is high, the content of metal element is lowered and thus sufficient cycle characteristics may not be obtained. Meanwhile, if the ratio is low, the silicon content is lowered and thus a capacity higher than that of the existing anode material such as the carbon material may not be obtained.

The anode active material further contains carbon as an element in addition to silicon and the metal element. Thereby, the cycle characteristics are further improved. The carbon content is preferably in the range from 4.9 mass % to 19.8 mass % both inclusive, and more preferably in the range from 9.9 mass % to 14.9 mass % both inclusive. In such a range, high effects are obtainable.

The anode active material further contains boron as an element in addition to silicon, the metal element and carbon. Thereby, even when the content of metal element is small, sufficient cycle characteristics are obtainable. The boron content is preferably in the range from 4.9 mass % to 19.8 mass % both inclusive, and more preferably in the range from 9.9 mass % to 14.9 mass % both inclusive. In such a range, high effects are obtainable.

The total of carbon content and boron content is preferably in the range from 9.8 mass % to 29.8 mass % both inclusive, and more preferably in the range from 14.8 mass % to 24.8 mass % both inclusive. In such a range, high effects are obtainable.

The anode active material may contain one or more other metal elements or nonmetal elements as element in addition to silicon, the metal element (cobalt, titanium and iron), boron and carbon if needed.

The anode active material has a phase with low crystalline or amorphous. The phase is a reaction phase capable of reacting with the electrode reactant such as lithium, and superior cycle characteristics are thereby obtainable when the anode active material has the reaction phase. The half-width of the diffraction peak obtained by X-ray diffraction of the phase preferably has the diffraction angle 2θ of 1 degree or more, in the case where CuKα-ray is used as a specific X ray and the sweep rate is 1 degree/min. Thereby, lithium or the like is more smoothly inserted and extracted, and the reactivity with the electrolyte is reduced when using the anode active material for the secondary battery including the electrolyte.

Whether or not the diffraction peak obtained by X-ray diffraction corresponds to the reaction phase capable of reacting with the electrode reactant such as lithium is easily determined by comparison between the X-ray diffraction chart before the electrochemical reaction with the electrode reactant or the like and the X-ray diffraction chart after the electrochemical reaction with the electrode reactant or the like. For example, if the position of the diffraction peak before the electrochemical reaction and the position of the diffraction peak after the electrochemical reaction are different from each other, the diffraction peak obtained by X-ray diffraction corresponds to the reaction phase capable of reacting with the electrode reactant or the like. In this anode active material, for example, the diffraction peak of the low crystalline reaction phase or the amorphous reaction phase is observed in the range of 2θ=from 20 to 50 degrees. The reaction phase includes, for example, the foregoing respective elements. It is thought that the reaction phase becomes low crystal or amorphous mainly due to carbon.

In some cases, the anode active material has a phase including the simple substance of each element or part thereof, in addition to the foregoing low crystalline phase or the foregoing amorphous phase.

Further, in the anode active material having the low crystalline phase or amorphous phase, part of carbon as an element is preferably bonded to silicon as other element. It is thought that lowering of cycle characteristics is caused by cohesion or crystallization of silicon or the like. In this regard, when part of carbon is bonded to part of silicon, such cohesion or crystallization is prevented. If all of carbon is bonded to silicon to become silicon carbide, the electrode reactant such as lithium becomes inactive (the anode active material is less likely to react with the electrode reactant).

Whether or not part of carbon is bonded to part of silicon is easily determined as in the above-mentioned reaction between the reaction phase and the electrode reactant, for example.

The anode active material is formed by, for example, mixing raw materials of the respective elements, melting the mixture in an electric furnace, a high frequency inducing furnace, an arc melting furnace or the like, and then solidifying the resultant. Otherwise, the anode active material is formed by, for example, various atomization methods such as gas atomization method and water atomization method, various rolling methods, or a method utilizing mechanochemical reaction such as mechanical alloying method and mechanical milling method. Specially, the anode active material is preferably formed by the method utilizing mechanochemical reaction, since the anode active material is thereby obtain the low crystalline structure or the amorphous structure. For such a method, for example, a planetary ball mill device may be used.

For the raw material, simple substances of the respective elements may be used by mixing. However, for some of the elements other than carbon, alloys are preferably used. If carbon is added to such alloys, and then the anode active material is synthesized by a method using mechanical alloying method, a low crystalline structure or an amorphous structure is obtainable, and the reaction time is able to be reduced. The raw materials may be either powder or a mass.

As carbon used as a raw material, for example, one or more carbon materials such as non-graphitizable carbon, graphitizable carbon, graphite, pyrolytic carbons, coke, glassy carbons, an organic polymer compound fired body, activated carbon, and carbon black may be used. Of the foregoing, the coke includes pitch coke, needle coke, petroleum coke and the like. The organic polymer compound fired body is a carbonized body obtained by firing a polymer compound such as a phenol resin and a furan resin at an appropriate temperature. The shape of these carbon materials may be fibrous, spherical, granular, or scale-like.

The anode active material is used for a secondary battery as follows, for example.

First Secondary Battery

FIG. 1 illustrates a cross sectional structure of a first secondary battery. The secondary battery herein described is a lithium ion secondary battery in which the anode capacity is expressed by the capacity component based on insertion and extraction of lithium as an electrode reactant.

The secondary battery contains a spirally wound electrode body 20 in which a strip-shaped cathode 21 and a strip-shaped anode 22 are layered with a separator 23 in between and spirally wound inside a battery can 11 having the shape of an approximately hollow cylinder. The structure including the battery can 11 is called cylindrical type. The battery can 11 is made of, for example, iron plated by nickel. One end of the battery can 11 is closed, and the other end thereof is opened. A liquid electrolyte (so-called electrolytic solution) is injected into the battery can 11 and impregnated in the separator 23. A pair of insulating plates 12 and 13 is respectively arranged perpendicularly to the spirally wound periphery face so that the spirally wound electrode body 20 is sandwiched by the insulating plates 12 and 13.

At the open end of the battery can 11, a battery cover 14, and a safety valve mechanism 15 and a PTC (Positive Temperature Coefficient) device 16 provided inside the battery cover 14 are attached by being caulked with a gasket 17. Inside of the battery can 11 is thereby hermetically sealed. The battery cover 14 is made of, for example, a material similar to that of the battery can 11. The safety valve mechanism 15 is electrically connected to the battery cover 14 through the PTC device 16. In the safety valve mechanism 15, if the internal pressure of the battery becomes a certain level or more by internal short circuit, external heating or the like, a disk plate 15A flips to cut the electric connection between the battery cover 14 and the spirally wound electrode body 20. When temperature rises, the PTC device 16 increases the resistance value and thereby limits a current to prevent abnormal heat generation resulting from a large current. The gasket 17 is made of, for example, an insulating material and its surface is coated with asphalt.

For example, the spirally wound electrode body 20 is spirally wound centering on the center pin 24. A cathode lead 25 made of aluminum (Al) or the like is connected to the cathode 21 of the spirally wound electrode body 20, and an anode lead 26 made of nickel (Ni) or the like is connected to the anode 22. The cathode lead 25 is electrically connected to the battery cover 14 by being welded to the safety valve mechanism 15. The anode lead 26 is welded and thereby electrically connected to the battery can 11.

Figure 2:
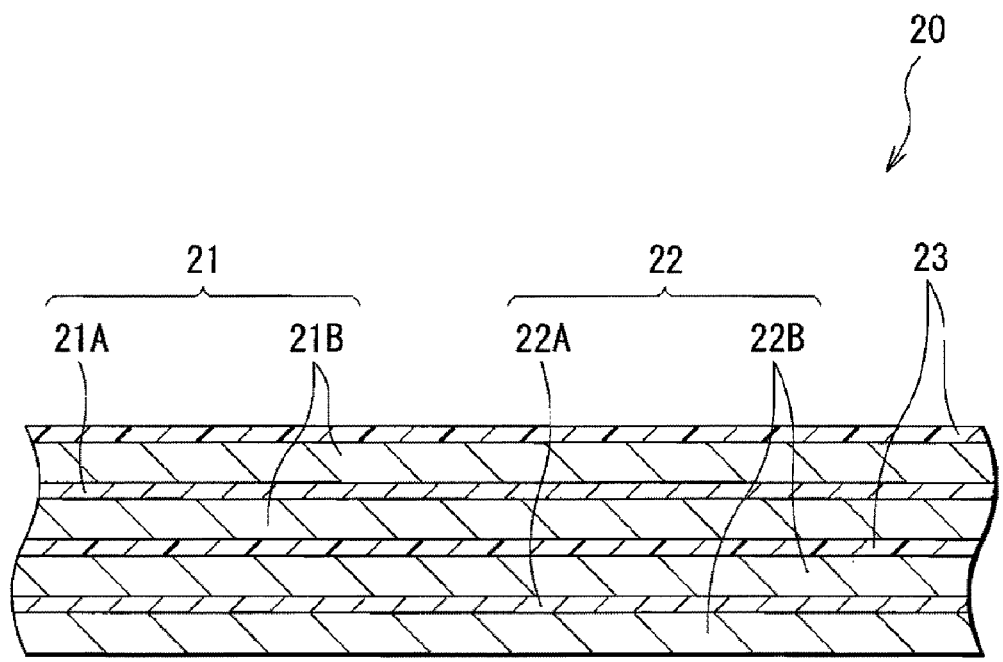
FIG. 2 a cross sectional view illustrating an enlarged part of the spirally wound electrode body illustrated in FIG. 1.

FIG. 2 illustrates an enlarged part of the spirally wound electrode body 20 illustrated in FIG. 1. The cathode 21 has a structure in which, for example, a cathode active material layer 21B is provided on a single face or the both faces of a cathode current collector 21A having a pair of faces. The cathode current collector 21A is made of, for example, a metal foil such as an aluminum foil. The cathode active material layer 21B contains, for example, one or more cathode active materials capable of inserting and extracting lithium. If necessary, the cathode active material layer 21B may contain an electrical conductor such as a carbon material and a binder such as polyvinylidene fluoride.

As the cathode active material capable of inserting and extracting lithium, for example, a metal sulfide or a metal oxide not containing lithium such as titanium sulfide ($TiS_2$), molybdenum sulfide ($MOS_2$), niobium selenide ($NbSe_2$), and vanadium oxide ($V_2O_5$) is included. Further, a lithium complex oxide with a main body of $Li_xMO_2$ (in the formula, M represents one or more transition metals. x varies according to charge and discharge states of the battery, and the value of x is generally in the range of $0.05 \leq x \leq 1.1$) or the like is included as well. As the transition metal M composing the lithium complex oxide, cobalt, nickel, or manganese (Mn) is preferable. As specific examples of such a lithium complex oxide, $LiCoO_2$, $LiNiO_2$, $Li_xNi_yCo_{1-y}O_2$ (in the formula, x and y vary according to charge and discharge states of the battery. In general, x and y are in the range of $0<x<1$, $0<y<1$), a lithium manganese complex oxide having a spinel structure or the like is included.

The anode 22 has a structure in which, for example, an anode active material layer 22B is provided on a single face or the both faces of an anode current collector 22A having a pair of faces as the cathode 21 does. The anode current collector 22A is made of a metal foil such as a copper foil.

The anode active material layer 22B contains, for example, the foregoing anode active material If necessary, the anode active material layer 22B contains a binder such as polyvinylidene fluoride. Since the anode active material is contained in the anode active material layer 22B, in the secondary battery, a high capacity is obtained, and the cycle characteristics are improved. The anode active material layer 22B may contain other anode active material and other material such as an electrical conductor in addition to the foregoing anode active material. Other anode active materials include, for example, a carbon material capable of inserting and extracting lithium. The carbon material is preferably used, since the carbon material improves the charge and discharge cycle characteristics, and functions as an electrical conductor. Examples of the carbon material include a material similar to that used in forming the anode active material.

The ratio of the carbon material is preferably in the range from 1 mass % to 95 mass % both inclusive to the foregoing anode active material. If the amount of the carbon material is small, the electric conductivity of the anode 22 may be lowered. Meanwhile, if the amount of the carbon material is large, the capacity may be lowered.

The separator 23 separates the cathode 21 from the anode 22, and passes lithium ions while preventing current short circuit due to contact of the both electrodes. The separator 23 is made of, for example, a porous film made of a synthetic resin such as polytetrafluoroethylene, polypropylene, and polyethylene, or a ceramic porous film. The separator 23 may have a structure in which two or more foregoing porous films are layered.

The electrolytic solution impregnated in the separator 23 contains a solvent and an electrolyte salt dissolved in the solvent. Examples of the solvent include propylene carbonate, ethylene carbonate, diethyl carbonate, dimethyl carbonate, 1,2-dimethoxyethane, 1,2-diethoxyethane, γ-butyrolactone, tetrahydrofuran, 2-methyltetrahydrofuran, 1,3-dioxolane, 4-methyl-1,3-dioxolane, diethyl ether, sulfolane, methylsulfolane, acetonitrile, propionitrile, anisole, ester acetate, ester butylate, and ester propionate. One of the solvents may be used singly, or two or more thereof may be used by mixing.

The solvent preferably contains a cyclic ester carbonate derivative having halogen as an element, since thereby decomposition reaction of the solvent in the anode 22 is prevented, and thus the cycle characteristics are improved. Specific examples of such a cyclic ester carbonate derivative include 4-fluoro-1,3-dioxolan-2-one represented by Chemical formula 1,4-difluoro-1,3-dioxolan-2-one represented by Chemical formula 2,4,5-difluoro-1,3-dioxolan-2-one represented by Chemical formula 3, 4-difluoro-5-fluoro-1,3-dioxolan-2-one represented by Chemical formula 4, 4-chrolo-1,3-dioxolan-2-one represented by Chemical formula 5, 4,5-dichrolo-1,3-dioxolan-2-one represented by Chemical formula 6, 4-bromo-1,3-dioxolan-2-one represented by Chemical formula 7, 4-iodine-1,3-dioxolan-2-one represented by Chemical formula 8, 4-fluoromethyl-1,3-dioxolan-2-one represented by Chemical formula 9, 4-trifluoromethyl-1,3-dioxolan-2-one represented by Chemical formula 10 and the like. Specially, 4-fluoro-1,3-dioxolan-2-one is desirable, since higher effects are thereby obtainable.

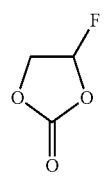

Chemical formula 1

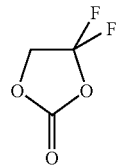

Chemical formula 2

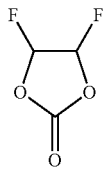

Chemical formula 3

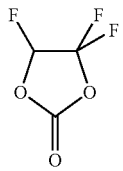

Chemical formula 4

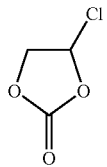

Chemical formula 5

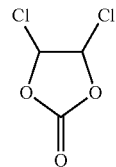

Chemical formula 6

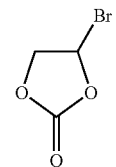

Chemical formula 7

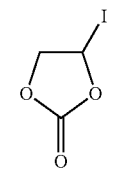

Chemical formula 8

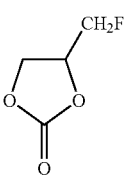

Chemical formula 9

Chemical formula 10

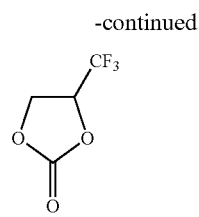

The solvent may be composed of only the ester carbonate derivative. However, the solvent is preferably a mixture of the ester carbonate derivative and a low-boiling point solvent whose boiling point is 150 deg C. or less at the atmospheric pressure ($1.01325 \times 10^5$ Pa), since thereby the ion conductivity is improved. The content of ester carbonate derivative is preferably in the range from 0.1 mass % to 80 mass % both inclusive to the entire solvent. If the content is small, the effects to prevent the decomposition reaction of the solvent in the anode 22 may be insufficient. Meanwhile, if the content is large, the viscosity may be increased, and thus the ion conductivity may be lowered.

As the electrolyte salt, for example, a lithium salt is included. One thereof may be used singly, or two or more thereof may be used by mixing. Examples of the lithium salt include $LiClO_4$, $LiAsF_6$, $LiPF_6$, $LiBF_4$, $LiB(C_6H_5)_4$, $CH_3SO_3L_1$, $CF_3SO_3Li$, $LiCl$, $LiBr$ or the like. Though the lithium salt is preferably used as an electrolyte salt, it is not necessary to use the lithium salt. Lithium ions contributing to charge and discharge are enough if provided by the cathode 21 or the like.

The secondary battery is manufactured, for example, as follows.

First, for example, a cathode active material, and if necessary, an electrical conductor and a binder are mixed to prepare a cathode mixture. After that, the cathode mixture is dispersed in a mixed solvent such as N-methyl-2-pyrrolidone to form cathode mixture slurry. Subsequently, the cathode current collector 21A is coated with the cathode mixture slurry, which is dried and compressed to form the cathode active material layer 21B, and thereby the cathode 21 is formed. After that, the cathode lead 25 is welded to the cathode 21.

Further, for example, the foregoing anode active material and if necessary, other anode active material and a binder are mixed to prepare an anode mixture. The anode mixture is dispersed in a mixed solvent such as N-methyl-2-pyrrolidone to form anode mixture slurry. Subsequently, the anode current collector 22A is coated with the anode mixture slurry, which is dried and compressed to form the anode active material layer 22B, and thereby the anode 22 is formed. After that, the anode lead 26 is welded to the anode 22.

Subsequently, the cathode 21 and the anode 22 are spirally wound with the separator 23 in between. An end of the cathode lead 25 is welded to the safety valve mechanism 15, and an end of the anode lead 26 is welded to the battery can 11. The spirally wound cathode 21 and the spirally wound anode 22 are sandwiched between the pair of insulating plates 12 and 13, and are contained in the battery can 11. Subsequently, an electrolytic solution is injected into the battery can 11. After that, at the open end of the battery can 11, the battery cover 14, the safety valve mechanism 15, and the PTC device 16 are fixed by being caulked with the gasket 17. The secondary battery illustrated in FIG. 1 and FIG. 2 is thereby fabricated.

In the secondary battery, when charged, for example, lithium ions are extracted from the cathode 21, and are inserted in the anode 22 through the electrolyte. When discharged, for example, lithium ions are extracted from the anode 22, and are inserted in the cathode 21 through the electrolyte.

As above, according to the anode active material of this embodiment, since the anode active material contains silicon as an element, the high capacity is obtainable. Further, the anode active material contains one or more of metal elements selected from the group consisting of cobalt, titanium and iron as an element, and the ratio of silicon to the total of the silicon content and the content of the metal element is from 70 mass % to 95 mass % both inclusive. Therefore, the cycle characteristics are improved while the high capacity is maintained. Moreover, the anode active material further contains boron and carbon as an element, the boron content is from 4.9 mass % to 19.8 mass % both inclusive, and the total of the boron content and the carbon content is from 9.8 mass % to 29.8 mass % both inclusive. Therefore, the cycle characteristics are further improved. Furthermore, the anode active material is capable of being reacted with the electrode reactant such as lithium, and the half-width of diffraction peak obtained by X-ray diffraction is 1 degree or more. Therefore, the electrode reactant or the like is smoothly inserted and extracted and when used for the secondary battery, the reactivity with the electrolyte is lowered. Since the secondary battery of the embodiment uses the foregoing anode active material, the high capacity is obtainable and the superior cycle characteristics are obtainable.

In particular, when the electrolyte contains the cyclic ester carbonate derivative containing halogen as an element, the decomposition reaction of the solvent in the anode 22 is prevented. Therefore, the cycle characteristics are further improved. In this case, if the content of the cyclic ester carbonate derivative is in the range from 0.1 mass % to 80 mass % both inclusive, more preferably in the range from 0.5 mass % to 70 mass % both inclusive, and much more preferably in the range from 20 mass % to 60 mass % both inclusive, higher effects are obtainable.

Second Secondary Battery

Figure 3:
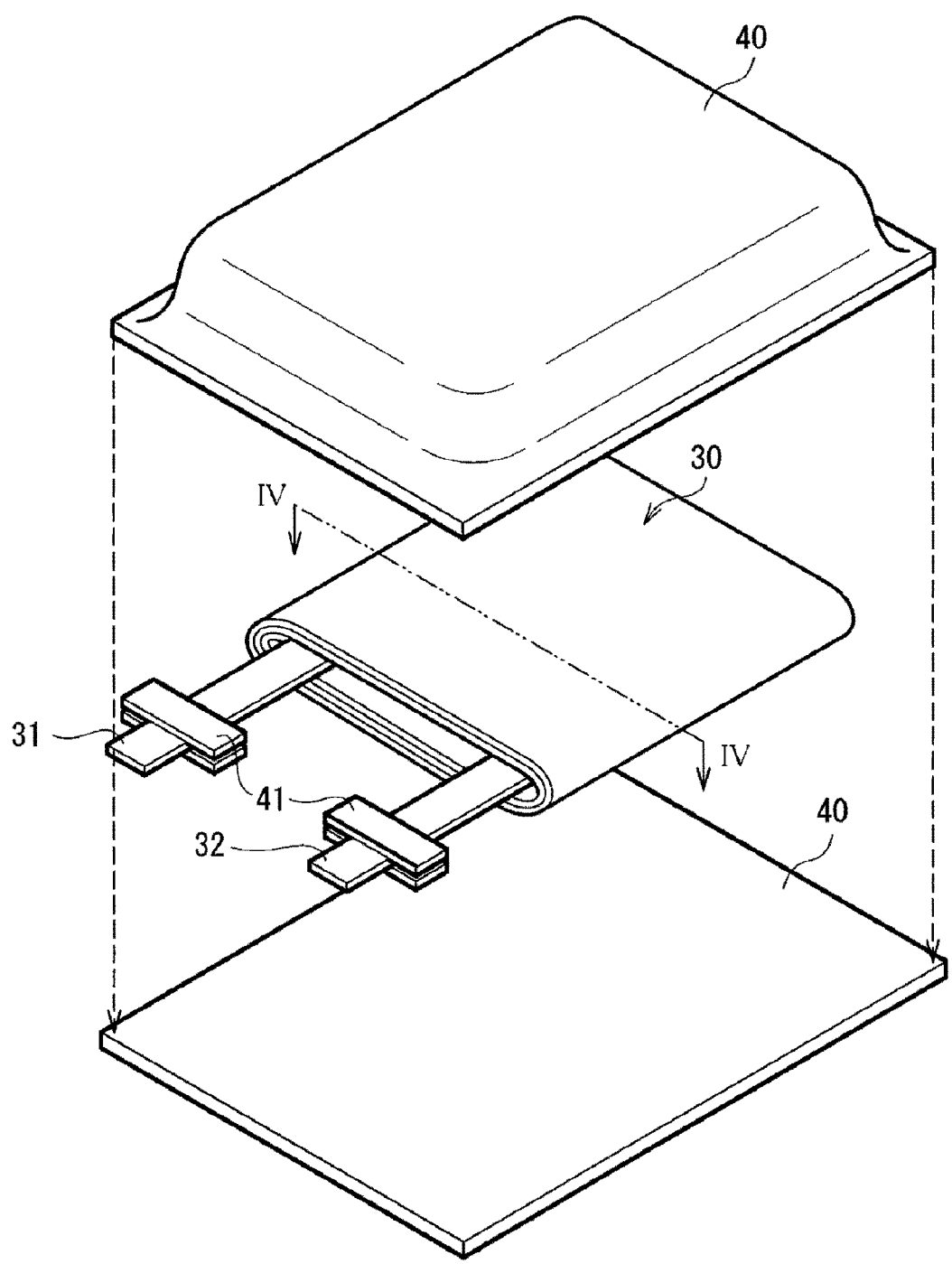
FIG. 3 is an exploded perspective view illustrating a structure of a second secondary battery according to the embodiment of the invention.

FIG. 3 illustrates an exploded perspective structure of a second secondary battery. In the second secondary battery, a spirally wound electrode body 30 on which a cathode lead 31 and an anode lead 32 are attached is contained in a film package member 40. The size, the weight, and the thickness of the battery are able to be reduced. The secondary battery is, for example, a lithium ion secondary battery similar to the first secondary battery, and the battery structure including the film package member 40 is called the laminated type.

The cathode lead 31 and the anode lead 32 are respectively directed from inside to outside of the package member 40 in the same direction, for example. The cathode lead 31 and the anode lead 32 are made of, for example, a metal material such as aluminum, copper, nickel, and stainless, and are respectively in the shape of a thin plate or mesh.

The package member 40 is made of a rectangular aluminum laminated film in which, for example, a nylon film, an aluminum foil, and a polyethylene film are bonded together in this order. The package member 40 is, for example, arranged so that the polyethylene film side faces the spirally wound electrode body 30, and the respective outer edges are contacted to each other by fusion bonding or an adhesive. An adhesive film 41 to protect from entering of outside air is inserted between the package member 40 and the cathode lead 31, the anode lead 32. The adhesive film 41 is made of a material having adhesion to the cathode lead 31 and the anode lead 32, for example, and is made of a polyolefin resin such as polyethylene, polypropylene, modified polyethylene, and modified polypropylene.

The package member 40 may be made of a laminated film having other structure, a polymer film such as polypropylene, or a metal film, instead of the foregoing aluminum laminated film.

Figure 4:
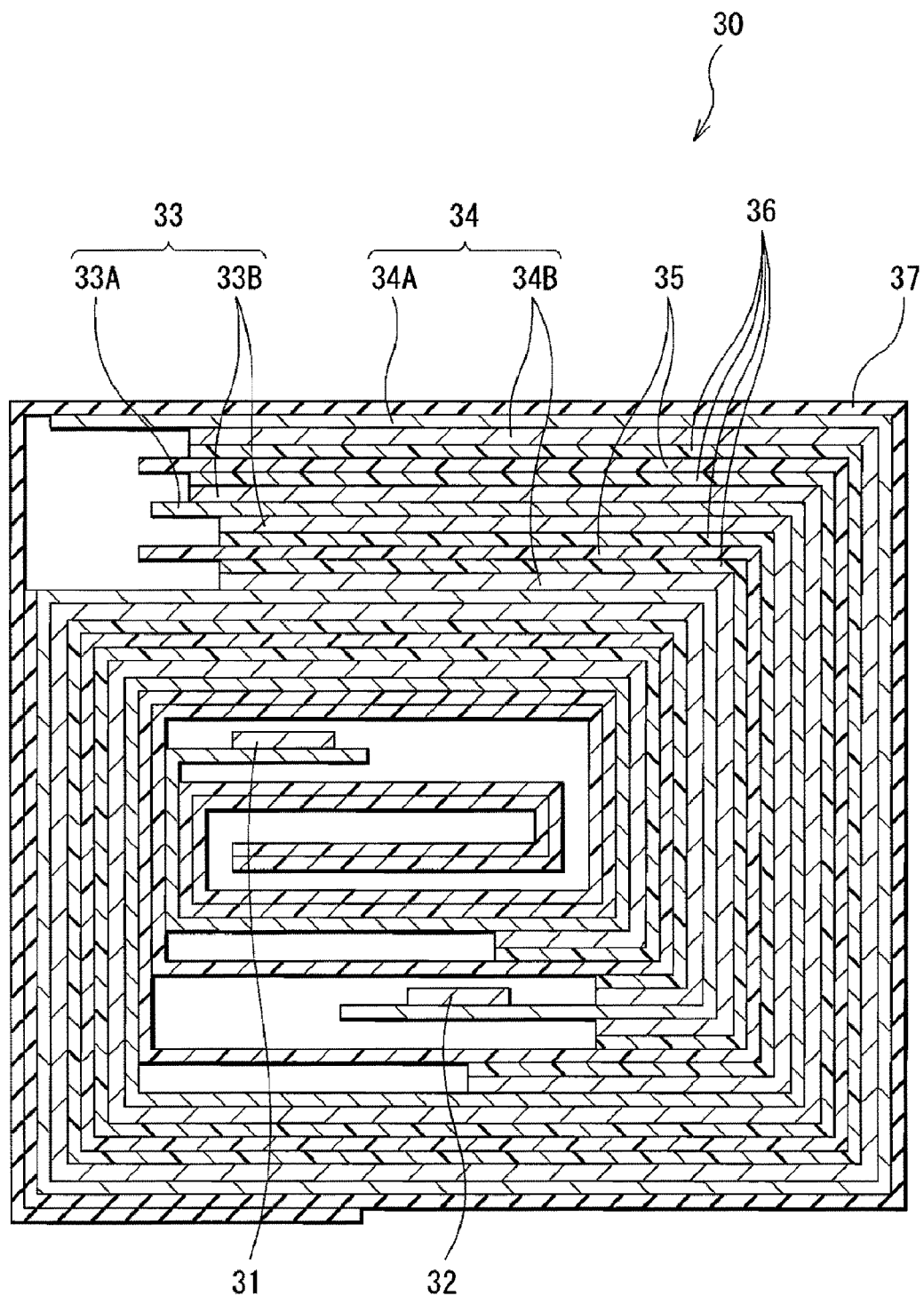
FIG. 4 is a cross sectional view illustrating a structure taken along line IV-IV of the spirally wound electrode body illustrated in FIG. 3.

FIG. 4 illustrates a cross sectional structure taken along line IV-IV of the spirally wound electrode body 30 illustrated in FIG. 3. In the spirally wound electrode body 30, a cathode 33 and an anode 34 are layered with a separator 35 and an electrolyte layer 36 in between and then spirally wound. The outermost periphery thereof is protected by a protective tape 37.

The cathode 33 has a structure in which a cathode active material layer 33B is provided on a single face or the both faces of a cathode current collector 33A. The anode 34 has a structure in which an anode active material layer 34B is provided on a single face or the both faces of an anode current collector 34A. Arrangement is made so that the anode active material layer 34B side faces the cathode active material layer 33B. The structures of the cathode current collector 33A, the cathode active material layer 33B, the anode current collector 34A, the anode active material layer 34B, and the separator 35 are similar to those of the cathode current collector 21A, the cathode active material layer 21B, the anode current collector 22A, the anode active material layer 22B, and the separator 23 of the foregoing first secondary battery.

The electrolyte layer 36 is so-called gelatinous, containing an electrolytic solution and a polymer compound that holds the electrolytic solution. The gel electrolyte is preferable, since thereby high ion conductivity is obtainable and liquid leakage is prevented. The composition of the electrolytic solution (a solvent and an electrolyte salt) is similar to that of the electrolytic solution in the foregoing first secondary battery. As the polymer compound, for example, a fluorinated polymer compound such as polyvinylidene fluoride and a copolymer of vinylidene fluoride and hexafluoropropylene, an ether polymer compound such as polyethylene oxide and a cross-linked compound containing polyethylene oxide, or polyacrylonitrile is included. In particular, in terms of redox stability, the fluorinated polymer compound is desirable.

Instead of the electrolyte layer 36 in which the electrolytic solution is held by the polymer compound, the electrolytic solution may be directly used. In this case, the electrolytic solution is impregnated in the separator 35.

The secondary battery including the gel electrolyte layer 36 is manufactured, for example, as follows.

First, a precursor solution containing a solvent, an electrolyte salt, a polymer compound, and a mixed solvent is prepared. Then, the cathode 33 and the anode 34 are respectively coated with the precursor solution. After that, the mixed solvent is volatilized to form the electrolyte layer 36. Subsequently, the cathode lead 31 is attached to an end of the cathode current collector 33A by welding or the like, and the anode lead 32 is attached to an end of the anode current collector 34A by welding or the like. Subsequently, the cathode 33 and the anode 34 formed with the electrolyte layer 36 are layered with the separator 35 in between to obtain a lamination. After the lamination is spirally wound in the longitudinal direction, a protective tape 37 is adhered to the outermost periphery thereof to form the spirally wound electrode body 30. Finally, for example, the spirally wound electrode body 30 is sandwiched between the package members 40, and outer edges of the package members 40 are adhered by thermal fusion bonding or the like to enclose the spirally wound electrode body 30. The adhesive film 41 is inserted between the cathode lead 31/the anode lead 32 and the package member 40. Thereby, the secondary battery illustrated in FIG. 3 and FIG. 4 is fabricated.

Otherwise, the secondary battery including the gel electrolyte layer 36 may be manufactured as follows. First, the cathode 33 and the anode 34 are formed as described above, and the cathode lead 31 and the anode lead 32 are respectively attached on the cathode 33 and the anode 34. After that, the cathode 33 and the anode 34 are layered with the separator 35 in between and spirally wound. The protective tape 37 is adhered to the outermost periphery thereof, and thereby a spirally wound body as a precursor of the spirally wound electrode body 30 is formed. Subsequently, the spirally wound body is sandwiched between the package members 40, the peripheral edges other than one side are contacted by thermal fusion-bonding or the like to obtain a pouched state, and the spirally wound body is contained in the package member 40. Subsequently, a composition of matter for electrolyte containing a solvent, an electrolyte salt, a monomer as a raw material for a polymer compound, a polymerization initiator, and if necessary other material such as a polymerization inhibitor is prepared, which is injected into the package member 40. Finally, the opening of the package member 40 is hermetically sealed by thermal fusion bonding under the vacuum atmosphere. After that, the monomer is polymerized by applying heat to obtain a polymer compound. Thereby, the gel electrolyte layer 36 is formed. Consequently, the secondary battery illustrated in FIG. 3 and FIG. 4 is fabricated.

The secondary battery works as the first secondary battery does, and provides effects similar to those of the first secondary battery.

Third Secondary Battery

Figure 5:
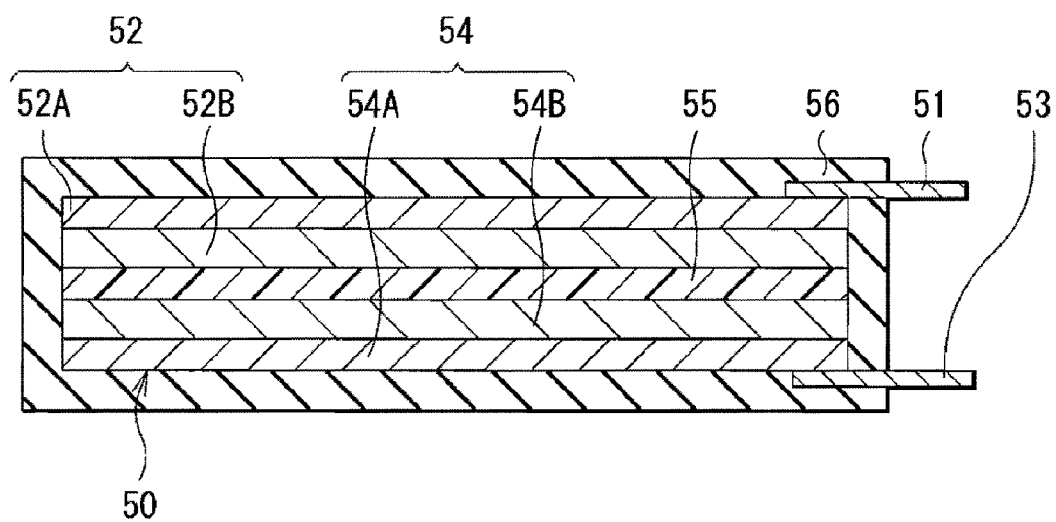
FIG. 5 is a cross sectional view illustrating a structure of a third secondary battery according to the embodiment of the invention.

FIG. 5 illustrates a cross sectional structure of a third secondary battery. The third secondary battery is a lithium ion secondary battery similar to the first secondary battery. In the secondary battery, a plate-like electrode body 50 in which a cathode 52 attached with a cathode lead 51 and an anode 54 attached with an anode lead 53 are oppositely arranged with an electrolyte layer 55 in between is contained in a film package member 56. The structure of the package member 56 is similar to that of the package member 40 in the foregoing second secondary battery.

The cathode 52 has a structure in which a cathode current collector 52A is provided with a cathode active material layer 52B. The anode 54 has a structure in which an anode current collector 54A is provided with an anode active material layer 54B. Arrangement is made so that the anode active material layer 54B side faces the cathode active material layer 52B. Structures of the cathode current collector 52A, the cathode active material layer 52B, the anode current collector 54A, and the anode active material layer 54B are respectively similar to those of the cathode current collector 21A, the cathode active material layer 21B, the anode current collector 22A, and the anode active material layer 22B in the first secondary battery described above.

The electrolyte layer 55 is made of, for example, a solid electrolyte. As a solid electrolyte, for example, either an inorganic solid electrolyte or a polymer solid electrolyte may be used as long as the solid electrolyte is a material having lithium ion conductivity. As an inorganic solid electrolyte, the electrolyte containing lithium nitride, lithium iodide or the like is included. The polymer solid electrolyte is the electrolyte mainly composed of an electrolyte salt and a polymer compound dissolving the electrolyte salt. As the polymer compound of the polymer solid electrolyte, for example, an ether polymer compound such as polyethylene oxide and a cross-linked compound containing polyethylene oxide, an ester polymer compound such as polymethacrylate, or an acrylate polymer compound may be used singly, by mixing, or copolymerization thereof.

The polymer solid electrolyte is formed by, for example, mixing a polymer compound, an electrolyte salt, and a mixed solvent, and then volatilizing the mixed solvent. Otherwise, the polymer solid electrolyte may be formed by dissolving an electrolyte salt, a monomer as a raw material for a polymer compound, a copolymerization initiator, and if necessary other material such as a polymerization inhibitor into a mixed solvent, volatilizing the mixed solvent, and then applying heat to polymerize the monomer to form the polymer compound.

The inorganic solid electrolyte is formed, for example, on the surface of the cathode 52 or the anode 54 by a vapor-phase deposition method such as sputtering method, vacuum evaporation method, laser ablation method, ion plating method, and CVD (Chemical Vapor Deposition) method; or a liquid-phase deposition method such as sol-gel method.

The secondary battery works similarly to the first or the second secondary battery does, and effects similar to those of the first or the second secondary battery are obtainable.

EXAMPLES

Specific examples of the invention will be described in detail.

Examples 1-1 to 1-5

First, anode active materials were formed. First, as raw materials, silicon powder, titanium powder, carbon powder, and boron powder were prepared. The silicon powder and the titanium powder were alloyed to obtain silicon-titanium alloy powder, to which the carbon powder and the boron powder were added and the resultant was dry-blended. At that time, the ratios of the raw materials (raw material ratio: mass %) were changed as shown in Table 1. Specifically, the raw material ratio of boron was set to the constant value of 10 mass %. The raw material ratio of silicon to the total of raw material ratios of silicon and titanium (hereinafter referred to as "Si/(Si+Ti)") was set to the constant value of 85 mass %. The raw material ratio of carbon was changed in the range from 5 mass % to 20 mass % both inclusive. Subsequently, 20 g of the foregoing mixture together with about 400 g of corundum being 9 mm in diameter was set into a reaction vessel of a planetary ball mill of ITO Seisakusho Co., Ltd. Subsequently, after inside of the reaction vessel was substituted with argon (Ar) atmosphere, 10-minute operation at a rotational speed of 250 rpm and 10-minute break were repeated until the total operation time became 50 hours. Finally, after the reaction vessel was cooled down to room temperature, the synthesized anode active material powder was taken out, from which coarse powder was removed through a 280-mesh screen.

TABLE 1

| | Si/(Si + Ti) = 85 mass % | | | | | | | | | | | | |
|---|---|---|---|---|---|---|---|---|---|---|---|---|---|
| | Raw material ratio (mass %) | | | | Analytical value (mass %) | | | | | Half-width | Initial charge capacity | 2 Cy. discharge capacity | 300 Cy. discharge capacity | Capacity retention ratio |
| | Si | Ti | C | B | Si | Ti | C | B | C + B | (deg) | (mAh/g) | (mAh/cm$^3$) | | (%) |
| Example 1-1 | 72.25 | 12.75 | 5 | 10 | 71.5 | 12.6 | 4.9 | 9.9 | 14.8 | 2.6 | 2125 | 148 | 87 | 59 |
| Example 1-2 | 71.4 | 12.6 | 6 | 10 | 70.7 | 12.5 | 5.9 | 9.9 | 15.8 | 2.8 | 2143 | 149 | 89 | 60 |
| Example 1-3 | 68 | 12 | 10 | 10 | 67.3 | 11.9 | 9.9 | 9.9 | 19.8 | 3.2 | 2143 | 152 | 114 | 75 |
| Example 1-4 | 63.75 | 11.25 | 15 | 10 | 63.1 | 11.1 | 14.9 | 9.9 | 24.8 | 3.5 | 2000 | 145 | 103 | 71 |
| Example 1-5 | 59.5 | 10.5 | 20 | 10 | 58.9 | 10.4 | 19.8 | 9.9 | 29.7 | 3.9 | 1880 | 141 | 83 | 59 |
| Comparative example 1-1 | 76.5 | 13.5 | — | 10 | 75.7 | 13.4 | — | 9.9 | 9.9 | 0.9 | 1678 | 45 | 14 | 31 |
| Comparative example 1-2 | 56.95 | 10.05 | 23 | 10 | 56.4 | 9.9 | 22.8 | 9.9 | 32.7 | 4 | 1745 | 119 | 36 | 30 |

The obtained anode active material was provided with composition analysis. The carbon content was measured by a carbon-sulfur analyzer, and the silicon content, the titanium content, and the boron content were measured by ICP (Inductively Coupled Plasma) emission spectrometry. The analytical values (mass %) are shown in Table 1. All the raw material ratios and the analytical values shown in Table 1 are values obtained by half-adjusting the hundredth. The same will be applied to the following examples and comparative examples. Further, for the anode active material, X-ray diffraction was performed. As a result, the diffraction peak having a wide half-width in 2θ=from 20 to 50 degrees both inclusive was observed. The half-width (degree) of the diffraction peak is also shown in Table 1.

Figure 6:
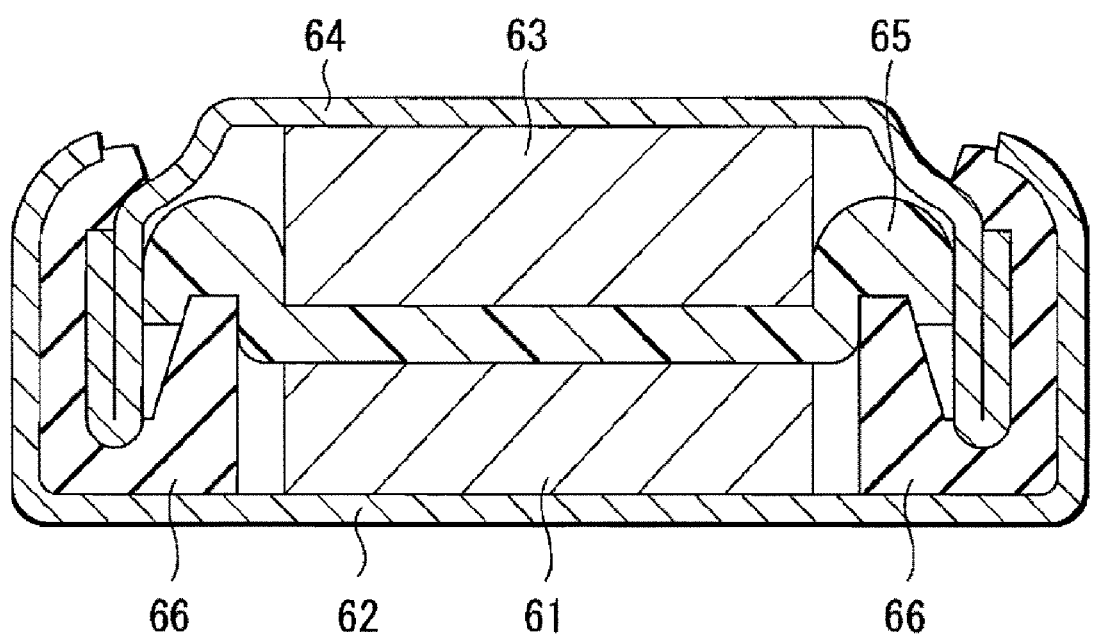
FIG. 6 is a cross sectional view illustrating a structure of a coin type secondary battery fabricated in examples.

Next, a coin type secondary battery illustrated in FIG. 6 was fabricated by using the foregoing anode active material powder. In the secondary battery, a test electrode 61 using the anode active material was contained in a cathode can 62, and a counter electrode 63 was attached to an anode can 64. After these components were layered with a separator 65 impregnated with an electrolytic solution in between, the resultant was caulked with a gasket 66. In preparing the test electrode 61, 60 parts by mass of anode active material powder, 30 parts by mass of graphite as an electrical conductor and other anode active material, 1 part by mass of acetylene black as an electrical conductor, and 4 parts by mass of polyvinylidene fluoride as a binder were mixed. The mixture was dispersed in an appropriate solvent to obtain slurry. After that, a copper foil current collector was coated with the slurry, which was then dried. After that, the resultant was punched out into a pellet being 15.2 mm in diameter. As the counter electrode 63, a punched-out metal lithium plate being 15.5 mm in diameter was used. Ethylene carbonate (EC), propylene carbonate (PC), and dimethyl carbonate (DMC) were mixed to obtain a mixed solvent, LiPF$_6$ as an electrolyte salt was dissolved in the mixed solvent, and the resultant was used as the electrolytic solution. The mixed solvent composition was EC:PC: DMC=30:20:50 at a mass ratio, and the concentration of the electrolyte salt was 1 mol/dm$^3$ (=1 mol/).

For the coin type secondary battery, the initial charge capacity (mAh/g) was examined. As the initial charge capacity, constant current charge was performed at the constant current of 1 mA until the battery voltage reached 0.2 mV. After that, constant voltage charge was performed at the constant voltage of 0.2 mV until the current reached 10 μA. The charge capacity per unit mass resulting from subtracting the mass of the copper foil current collector and the binder from the mass of the test electrode 61 was obtained. "Charge" herein means lithium insertion reaction to the anode active material. The results are shown in Table 1 and FIG. 7.

Further, the cylindrical type secondary battery illustrated in FIG. 1 and FIG. 2 was fabricated by using the foregoing anode active material powder. First, a cathode active material composed of a nickel oxide, Ketjen black as an electrical conductor, polyvinylidene fluoride as a binder were mixed at a mass ratio of nickel oxide:Ketjen black:polyvinylidene fluoride=94:3:3. The mixture was dispersed in N-methyl-2-pyrrolidone as a mixed solvent to obtain cathode mixture slurry. Subsequently, the both faces of the cathode current collector 21A made of a strip-shaped aluminum foil were uniformly coated with the cathode mixture slurry, which was dried. After that, the resultant was compression-molded by a rolling press machine to form the cathode active material layer 21B. Thereby, the cathode 21 was formed. After that, the cathode lead 25 made of aluminum was attached to an end of the cathode current collector 21A.

Further, the both faces of the anode current collector 22A made of a strip-shaped copper foil were uniformly coated with anode mixture slurry containing the foregoing anode active material, which was dried. After that, the resultant was compression-molded by a rolling press machine to form the anode active material layer 22B. Thereby, the anode 22 was formed. After that, the anode lead 26 made of nickel was attached to an end of the anode current collector 22A.

Subsequently, the separator 23 was prepared. The anode 22, the separator 23, the cathode 21, and the separator 23 were layered in this order. After that, the resultant lamination was spirally wound several times, and thereby the spirally wound electrode body 20 was formed. Subsequently, the spirally wound electrode body 20 was sandwiched between the pair of insulating plates 12 and 13. The anode lead 26 was welded to the battery can 11, and the cathode lead 25 was welded to the safety valve mechanism 15. After that, the spirally wound electrode body 20 was contained in the battery can 11 made of iron plated by nickel. Finally, the foregoing electrolytic solution was injected into the battery can 11 by pressure reduction method, and thereby the cylindrical type secondary battery was completed.

For the cylindrical type secondary battery, the cycle characteristics were examined. In this case, first, after constant current charge at the constant current of 0.5 A was performed until the battery voltage reached 4.2 V, constant voltage charge at the constant voltage of 4.2 V was performed until the current reached 10 mA. Subsequently, constant current discharge at constant current of 0.25 A was performed until the battery voltage reached 2.6 V, and thereby the first cycle of charge and discharge was performed. On and after the second cycle, after constant current charge at the constant current of 1.4 A was performed until the battery voltage reached 4.2 V, constant voltage charge at the constant voltage of 4.2 V was performed until the current reached 10 mA. Subsequently, constant current discharge at constant current of 1.0 A was performed until the battery voltage reached 2.6 V. After that, to examine the cycle characteristics, the ratio of the discharge capacity at the 300th cycle (300 Cy. discharge capacity: mAh/cm$^3$) to the discharge capacity at the second cycle (2 Cy. discharge capacity: mAh/cm$^3$), that is, the capacity retention ratio (%)=(discharge capacity at the 300th cycle/discharge capacity at the second cycle)×100 was obtained. The results are shown in Table 1 and FIG. 7.

As Comparative example 1-1 relative to Examples 1-1 to 1-5, an anode active material and a secondary battery were formed in the same manner as that in Examples 1-1 to 1-5, except that the carbon powder was not used as a raw material. As Comparative example 1-2, an anode active material and a secondary battery were formed in the same manner as that in Examples 1-1 to 1-5, except that the raw material ratio of carbon was set as shown in Table 1.

For the anode active materials of Comparative examples 1-1 and 1-2, in the same manner as that in Examples 1-1 to 1-5, the composition thereof was analyzed, and the half-width of the diffraction peak having a wide half-width observed in the range of 2θ=from 20 to 50 degree both inclusive was measured. The results are shown in Table 1.

For the secondary batteries of Comparative examples 1-1 and 1-2, the initial charge capacity and the cycle characteristics were examined in the same manner as that in Examples 1-1 to 1-5. The results are shown in Table 1 and FIG. 7.

Figure 7:
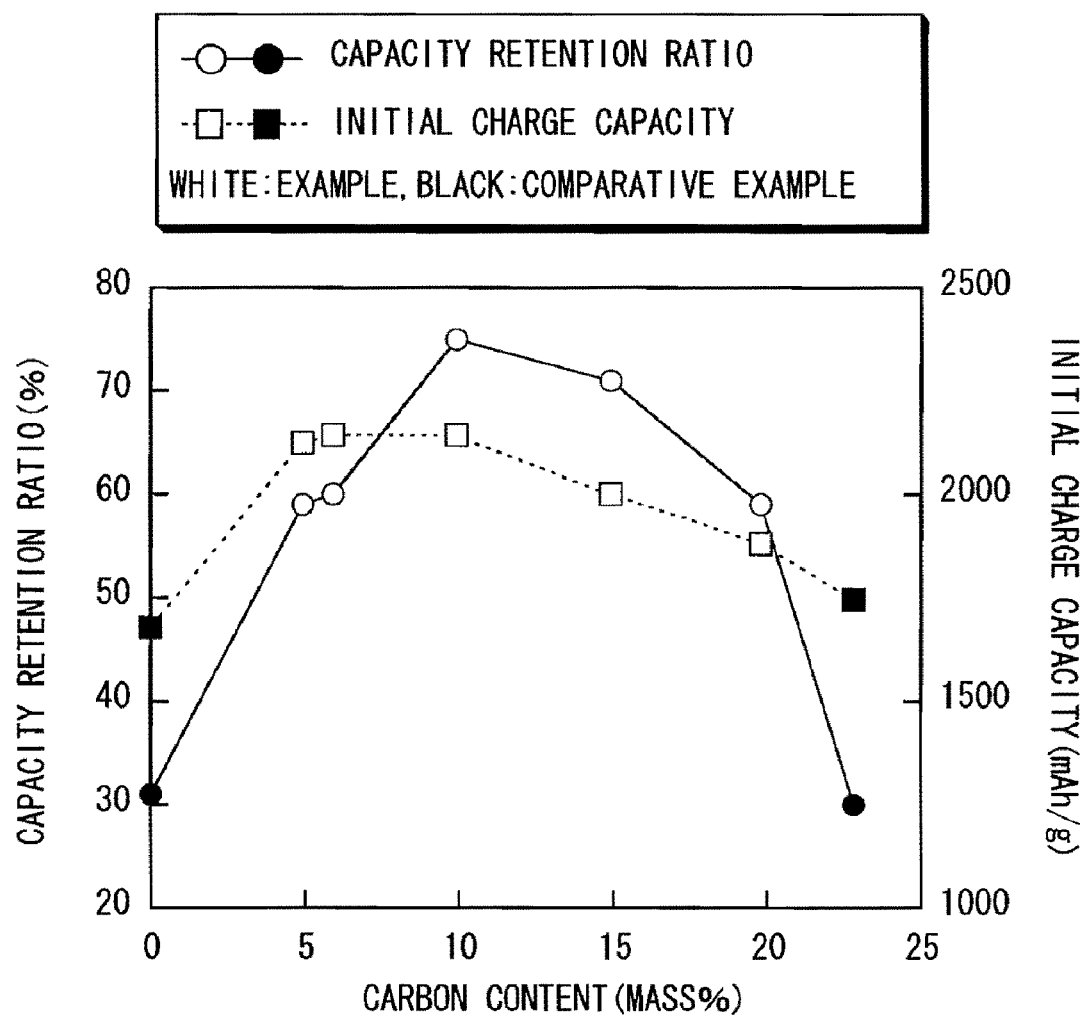
FIG. 7 is a characteristic diagram illustrating a relation between a carbon content, capacity retention ratio and initial charge capacity.

As evidenced by Table 1 and FIG. 7, in Examples 1-1 to 1-5 in which the carbon content in the anode active material was in the range from 4.9 mass % to 19.8 mass % both inclusive, the capacity retention ratio thereof was more significantly improved than that of Comparative examples 1-1 and 1-2 in which the carbon content was out of the range. In that case, the initial charge capacity and the discharge capacity were improved as well.

In particular, in the case where the carbon content was from 9.9 mass % to 14.9 mass % both inclusive, higher values were obtained.

That is, it was found that in the case where the carbon content was from 4.9 mass % to 19.8 mass % both inclusive, the capacity and the cycle characteristics were able to be improved. It was also found that the carbon content was more preferably from 9.9 mass % to 14.9 mass % both inclusive.

Examples 2-1 to 2-4

Anode active materials and secondary batteries were formed in the same manner as that in Examples 1-1 to 1-5, except that the raw material ratios of silicon, titanium, carbon, and boron were changed as shown in Table 2. Specifically, the raw material ratio of carbon was set to the constant value of 10 mass %, Si/(Si+Ti) was set to the constant value of 85 mass %, and the raw material ratio of boron was changed in the range from 5 mass % to 20 mass % both inclusive.

TABLE 2

| | Si/(Si + Ti) = 85 mass % | | | | | | | | | | | | |
|---|---|---|---|---|---|---|---|---|---|---|---|---|---|
| | Raw material ratio (mass %) | | | | Analytical value (mass %) | | | | | Half-width | Initial charge capacity | 2 Cy. discharge capacity | 300 Cy. discharge capacity | Capacity retention ratio |
| | Si | Ti | C | B | Si | Ti | C | B | C + B | (deg) | (mAh/g) | (mAh/cm$^3$) | | (%) |
| Example 2-1 | 72.25 | 12.75 | 10 | 5 | 71.5 | 12.6 | 9.9 | 4.9 | 14.8 | 2.6 | 2120 | 145 | 86 | 59 |
| Example 2-2 | 71.4 | 12.6 | 10 | 6 | 70.7 | 12.5 | 9.9 | 5.9 | 15.8 | 2.7 | 2133 | 148 | 87 | 59 |

TABLE 2-continued

| | Si/(Si + Ti) = 85 mass % | | | | | | | | | | | | |
|---|---|---|---|---|---|---|---|---|---|---|---|---|---|
| | Raw material ratio (mass %) | | | | Analytical value (mass %) | | | | | Half-width | Initial charge capacity | 2 Cy. discharge capacity | 300 Cy. discharge capacity | Capacity retention ratio |
| | Si | Ti | C | B | Si | Ti | C | B | C + B | (deg) | (mAh/g) | (mAh/cm³) | | (%) |
| Example 1-3 | 68 | 12 | 10 | 10 | 67.3 | 11.9 | 9.9 | 9.9 | 19.8 | 3.2 | 2143 | 152 | 114 | 75 |
| Example 2-3 | 63.75 | 11.25 | 10 | 15 | 63.1 | 11.1 | 9.9 | 14.9 | 24.8 | 3.5 | 2002 | 146 | 105 | 72 |
| Example 2-4 | 59.5 | 10.5 | 10 | 20 | 58.9 | 10.4 | 9.9 | 19.8 | 29.7 | 3.9 | 1882 | 141 | 85 | 60 |
| Comparative example 2-1 | 76.5 | 13.5 | 10 | — | 75.7 | 13.4 | 9.9 | — | 9.9 | 0.8 | 1564 | 42 | 13 | 32 |
| Comparative example 2-2 | 56.95 | 10.05 | 10 | 23 | 56.4 | 9.9 | 9.9 | 22.8 | 32.7 | 4 | 1740 | 115 | 39 | 34 |

As Comparative examples 2-1 and 2-2 relative to Examples 2-1 to 2-4, anode active materials and secondary batteries were formed in the same manner as that in Examples 2-1 to 2-4, except that the raw material ratio of boron was changed as shown in Table 2.

For the anode active materials of Examples 2-1 to 2-4 and Comparative examples 2-1 and 2-2, the composition thereof was analyzed and the half-width was measured in the same manner as that in Examples 1-1 to 1-5. The results are shown in Table 2. Further, for the secondary batteries, the initial charge capacity and the cycle characteristics were examined in the same manner as that in Examples 1-1 to 1-5. The results are shown in Table 2 and FIG. 8.

Figure 8:
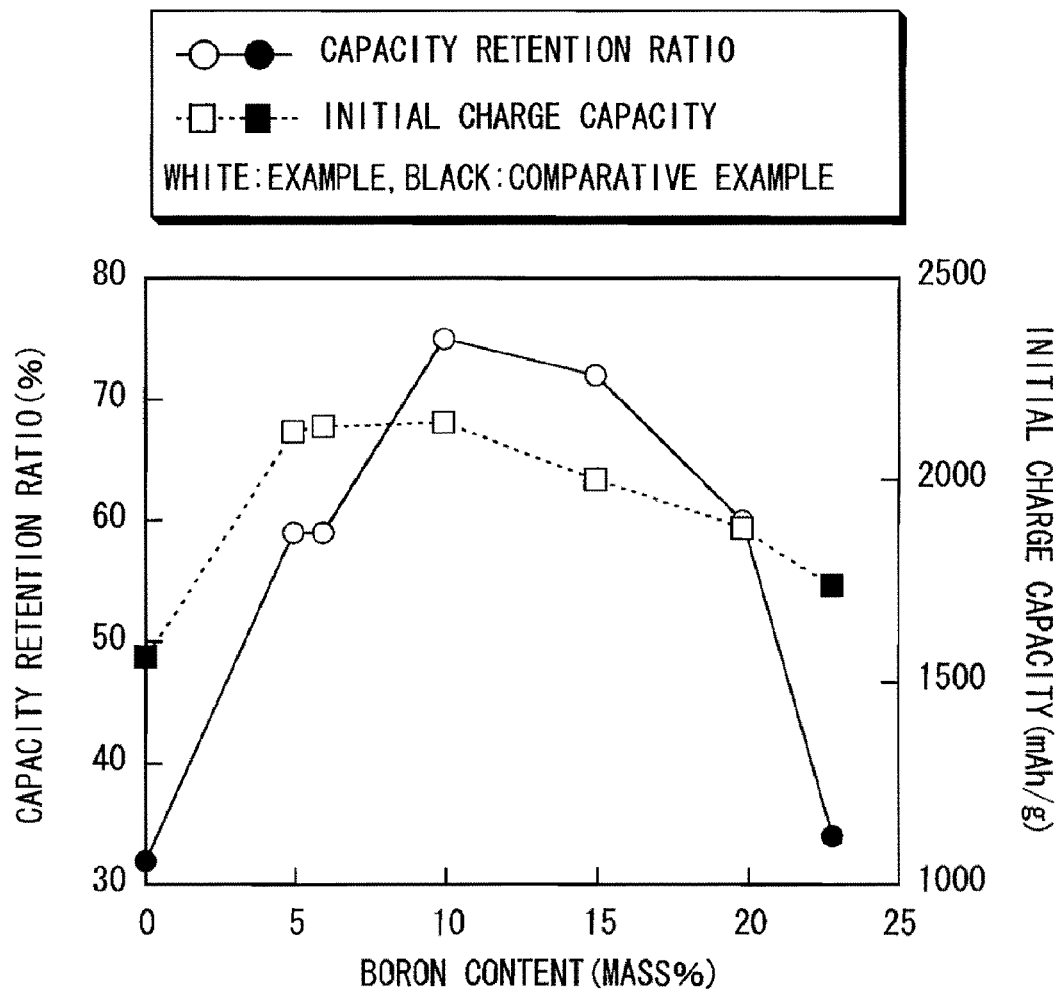
FIG. 8 is a characteristic diagram illustrating a relation between a boron content, the capacity retention ratio and the initial charge capacity.

As evidenced by Table 2 and FIG. 8, in Examples 2-1 to 2-4 in which the boron content was from 4.9 mass % to 19.8 mass % both inclusive, the capacity retention ratio was more dramatically improved than that of Comparative examples 2-1 and 2-2 in which boron content was out of the range. In that case, the initial charge capacity and the discharge capacity were improved.

In particular, in the case where the boron content was from 9.9 mass % to 14.9 mass % both inclusive, a higher value was obtained.

That is, it was found that in the case where the boron content was from 4.9 mass % to 19.8 mass % both inclusive, the capacity and the cycle characteristics were able to be improved. It was also found that the boron content was more preferably from 9.9 mass % to 14.9 mass % both inclusive.

Examples 3-1 to 3-7

Anode active materials and secondary batteries were formed in the same manner as that in Examples 1-1 to 1-5, except that the raw material ratios of silicon, titanium, carbon, and boron were changed as shown in Table 3. Specifically, Si/(Si+Ti) was set to the constant value of 85 mass %, and the total of raw material ratios of carbon and boron was changed in the range from 10 mass % to 30 mass % both inclusive.

TABLE 3

| | Si/(Si + Ti) = 85 mass % | | | | | | | | | | | | |
|---|---|---|---|---|---|---|---|---|---|---|---|---|---|
| | Raw material ratio (mass %) | | | | Analytical value (mass %) | | | | | Half-width | Initial charge capacity | 2 Cy. discharge capacity | 300 Cy. discharge capacity | Capacity retention ratio |
| | Si | Ti | C | B | Si | Ti | C | B | C + B | (deg) | (mAh/g) | (mAh/cm³) | | (%) |
| Example 3-1 | 76.5 | 13.5 | 5 | 5 | 75.7 | 13.4 | 4.9 | 4.9 | 9.8 | 2 | 2298 | 136 | 76 | 56 |
| Example 3-2 | 73.1 | 12.9 | 7 | 7 | 72.4 | 12.8 | 6.9 | 6.9 | 13.8 | 2.6 | 2186 | 148 | 90 | 61 |
| Example 3-3 | 72.3 | 12.8 | 7 | 8 | 71.5 | 12.6 | 6.9 | 7.9 | 14.8 | 2.7 | 2139 | 149 | 104 | 70 |
| Example 3-4 | 69.7 | 12.3 | 8 | 10 | 69.0 | 12.2 | 7.9 | 9.9 | 17.8 | 2.9 | 2156 | 149 | 107 | 72 |
| Example 1-3 | 68 | 12 | 10 | 10 | 67.3 | 11.9 | 9.9 | 9.9 | 19.8 | 3.2 | 2143 | 152 | 114 | 75 |
| Example 3-5 | 63.8 | 11.3 | 13 | 12 | 63.1 | 11.1 | 12.9 | 11.9 | 24.8 | 3.5 | 2005 | 146 | 107 | 73 |
| Example 3-6 | 61.2 | 10.8 | 13 | 15 | 60.6 | 10.7 | 12.9 | 14.9 | 27.8 | 3.7 | 1956 | 146 | 95 | 65 |
| Example 3-7 | 59.5 | 10.5 | 15 | 15 | 58.9 | 10.4 | 14.9 | 14.9 | 29.8 | 3.9 | 1884 | 142 | 87 | 61 |
| Comparative example 3-1 | 85 | 15 | — | — | 84.2 | 14.9 | — | — | — | 0.2 | 1575 | 61 | 0 | 0 |
| Comparative example 3-2 | 79.9 | 14.1 | 3 | 3 | 79.1 | 14.0 | 2.9 | 2.9 | 5.8 | 0.5 | 2405 | 101 | 0 | 0 |
| Comparative example 3-3 | 78.2 | 13.8 | 5 | 3 | 77.4 | 13.7 | 4.9 | 2.9 | 7.8 | 0.6 | 2356 | 115 | 35 | 30 |
| Comparative example 3-4 | 78.2 | 13.8 | 3 | 5 | 77.4 | 13.7 | 2.9 | 4.9 | 7.8 | 0.9 | 2368 | 115 | 30 | 26 |
| Comparative example 3-5 | 57 | 10.1 | 18 | 15 | 56.4 | 9.9 | 17.8 | 14.9 | 32.7 | 4 | 1750 | 119 | 37 | 31 |
| Comparative example 3-6 | 57 | 10.1 | 15 | 18 | 56.4 | 9.9 | 14.9 | 17.8 | 32.7 | 4.1 | 1761 | 117 | 33 | 28 |
| Comparative example 3-7 | 54.4 | 9.6 | 18 | 18 | 53.9 | 9.5 | 17.8 | 17.8 | 35.6 | 4.3 | 1500 | 86 | 9 | 10 |
| Comparative example 3-8 | 51 | 9 | 20 | 20 | 50.5 | 8.9 | 19.8 | 19.8 | 39.6 | 4.4 | 1134 | 71 | 0 | 0 |
| Comparative example 3-9 | 42.5 | 7.5 | 25 | 25 | 42.1 | 7.4 | 24.8 | 24.8 | 49.5 | 4.5 | 524 | 23 | 0 | 0 |

As Comparative examples 3-1 to 3-9 relative to Examples 3-1 to 3-7, anode active materials and secondary batteries were formed in the same manner as that in Examples 3-1 to 3-7, except that the total of raw material ratios of carbon and boron was changed as shown in Table 3.

For the anode active materials of Examples 3-1 to 3-7 and Comparative examples 3-1 to 3-9, the composition thereof was analyzed and the half-width was measured in the same manner as that in Examples 1-1 to 1-5. The results are shown in Table 3. Further, for the secondary batteries, the initial charge capacity and the cycle characteristics were examined in the same manner as that in Examples 1-1 to 1-5. The results are shown in Table 3 and FIG. 9.

Figure 9:
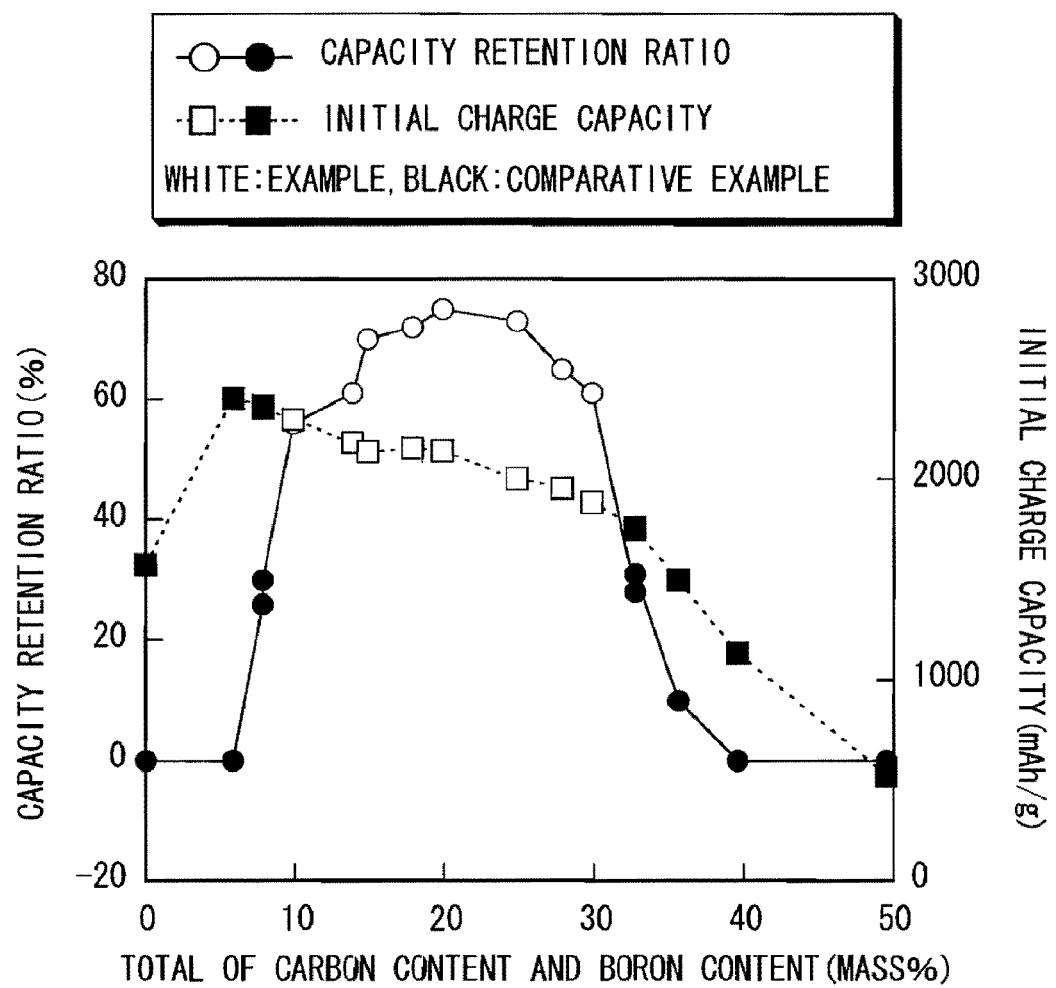
FIG. 9 is a characteristic diagram illustrating a relation between a total of the carbon content and the boron content, the capacity retention ratio and the initial charge capacity.

As evidenced by Table 3 and FIG. 9, in Examples 3-1 to 3-7 in which the total of carbon content and boron content was from 9.8 mass % to 29.8 mass % both inclusive, the capacity retention ratio was more dramatically improved than that of Comparative examples 3-1 to 3-9 in which the total of carbon content and boron content was out of the range. In that case, a high initial charge capacity and a high discharge capacity were obtained as well.

In particular, in the case where the foregoing total of carbon content and boron content was from 14.8 mass % to 24.8 mass % both inclusive, a higher value was obtained.

That is, it was found that in the case where the total of carbon content and boron content was from 9.8 mass % to 29.8 mass % both inclusive, the capacity and the cycle characteristics were able to be improved. It was also found that the total of carbon content and boron content was more preferably from 14.8 mass % to 24.8 mass % both inclusive.

Examples 4-1 to 4-5

Anode active materials and secondary batteries were formed in the same manner as that in Examples 1-1 to 1-5, except that the raw material ratios of silicon, titanium, carbon, and boron were changed as shown in Table 4. Specifically, the total of raw material ratios of carbon and boron was set to the constant value of 10 mass %, and Si/(Si+Ti) was changed in the range from 70 mass % to 95 mass % both inclusive.

As Comparative examples 4-1 to 4-4 relative to Examples 4-1 to 4-5, anode active materials and secondary batteries were formed in the same manner as that in Examples 4-1 to 4-5, except that Si/(Si+Ti) was changed as shown in Table 4.

For the anode active materials of Examples 4-1 to 4-5 and Comparative examples 4-1 to 4-4, the composition thereof was analyzed and the half-width was measured in the same manner as that in Examples 1-1 to 1-5. The results are shown in Table 4. Further, for the secondary batteries, the initial charge capacity and the cycle characteristics were examined in the same manner as that in Examples 1-1 to 1-5. The results are shown in Table 4 and FIG. 10.

Figure 10:
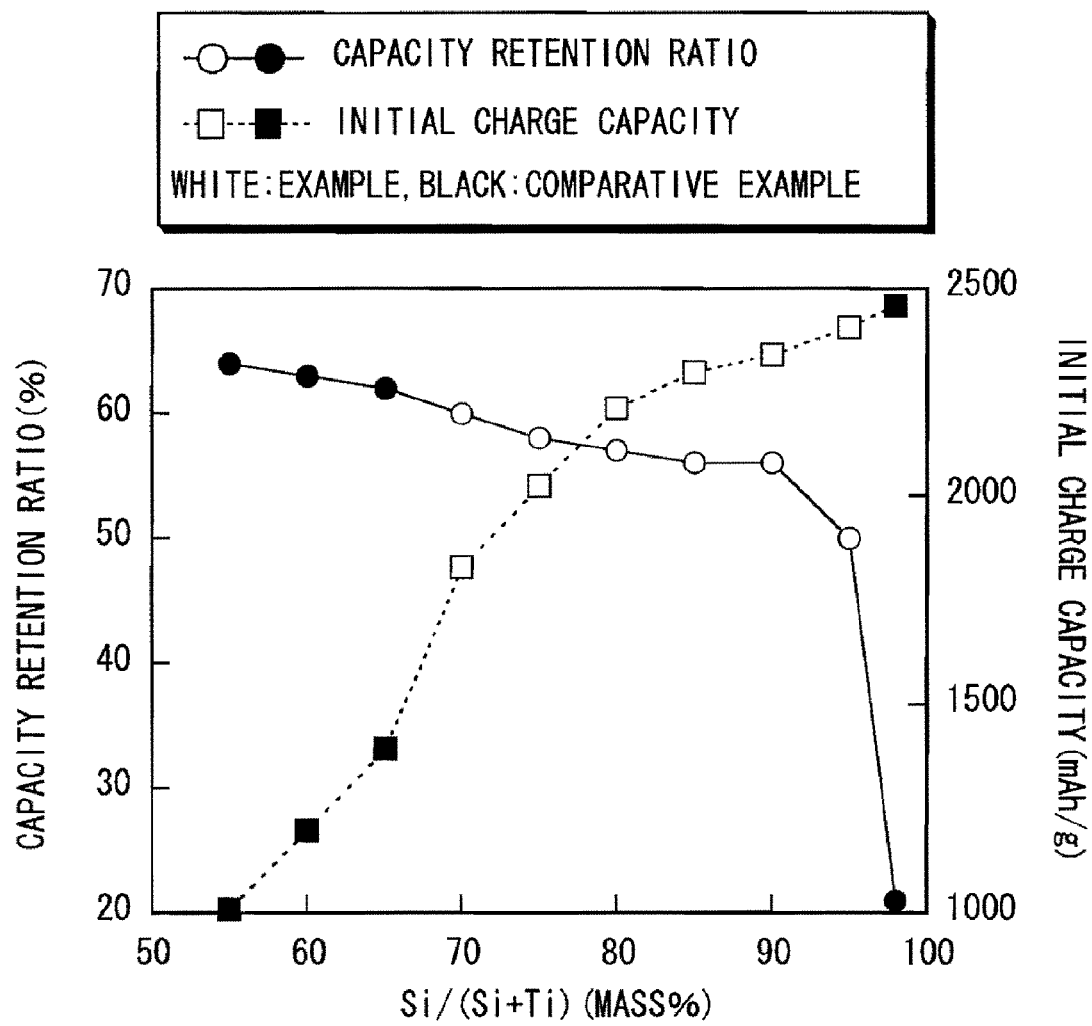
FIG. 10 is a characteristic diagram illustrating a relation between a ratio of a silicon content to a total of the silicon content and a titanium content, the capacity retention ratio and the initial charge capacity.

As evidenced by Table 4 and FIG. 10, in Examples 4-1 to 4-5 in which Si/(Si+Ti) was from 70 mass % to 95 mass % both inclusive, the capacity retention ratio was more dramatically improved than that of Comparative example 4-1 in which Si/(Si+Ti) was over 95 mass %, and the initial charge capacity was more dramatically improved than that of Comparative examples 4-2 to 4-4 in which Si/(Si+Ti) was under 70 mass %. In particular, in the case where Si/(Si+Ti) was from 80 mass % to 90 mass % both inclusive, a high initial charge capacity and a high capacity retention ratio were obtained.

That is, it was found that in the case where the total of carbon content and boron content was 9.8 mass %, the capacity and the cycle characteristics were able to be improved when Si/(Si+Ti) was from 70 mass % to 95 mass % both inclusive. In addition, it was also found that Si/(Si+Ti) was more preferably from 80 mass % to 90 mass % both inclusive.

Examples 5-1 to 5-5

Anode active materials and secondary batteries were formed in the same manner as that in Examples 1-1 to 1-5, except that the raw material ratios of silicon, titanium, carbon, and boron were changed as shown in Table 5. Specifically, the total of raw material ratios of carbon and boron was set to the constant value of 20 mass %, and Si/(Si+Ti) was changed in the range from 70 mass % to 95 mass % both inclusive.

TABLE 4

| | C + B = 9.8 mass % | | | | | | | | | | | | |
|---|---|---|---|---|---|---|---|---|---|---|---|---|---|
| | Raw material ratio (mass %) | | | | Analytical value (mass %) | | | | | | Initial charge capacity | 2 Cy. discharge capacity | 300 Cy. discharge capacity | Capacity retention ratio |
| | Si | Ti | C | B | Si | Ti | C | B | Si/(Si + Ti) | Half-width (deg) | (mAh/g) | (mAh/cm³) | | (%) |
| Example 4-1 | 85.5 | 4.5 | 5 | 5 | 84.6 | 4.5 | 4.9 | 4.9 | 95 | 1.2 | 2406 | 140 | 70 | 50 |
| Example 4-2 | 81 | 9 | 5 | 5 | 80.2 | 8.9 | 4.9 | 4.9 | 90 | 1.6 | 2341 | 138 | 77 | 56 |
| Example 3-1 | 76.5 | 13.5 | 5 | 5 | 75.7 | 13.4 | 4.9 | 4.9 | 85 | 2 | 2298 | 136 | 76 | 56 |
| Example 4-3 | 72 | 18 | 5 | 5 | 71.3 | 17.8 | 4.9 | 4.9 | 80 | 2.2 | 2213 | 131 | 75 | 57 |
| Example 4-4 | 67.5 | 22.5 | 5 | 5 | 66.8 | 22.3 | 4.9 | 4.9 | 75 | 2.3 | 2024 | 120 | 70 | 58 |
| Example 4-5 | 63 | 27 | 5 | 5 | 62.4 | 26.7 | 4.9 | 4.9 | 70 | 2.5 | 1831 | 108 | 65 | 60 |
| Comparative example 4-1 | 88.2 | 1.8 | 5 | 5 | 87.3 | 1.8 | 4.9 | 4.9 | 98 | 0.5 | 2460 | 141 | 30 | 21 |
| Comparative example 4-2 | 58.5 | 31.5 | 5 | 5 | 57.9 | 31.2 | 4.9 | 4.9 | 65 | 2.7 | 1395 | 84 | 52 | 62 |
| Comparative example 4-3 | 54 | 36 | 5 | 5 | 53.5 | 35.6 | 4.9 | 4.9 | 60 | 2.8 | 1200 | 73 | 46 | 63 |
| Comparative example 4-4 | 49.5 | 40.5 | 5 | 5 | 49 | 40.1 | 4.9 | 4.9 | 55 | 2.9 | 1008 | 61 | 39 | 64 |

TABLE 5

C + B = 19.8 mass %

| | Raw material ratio (mass %) | | | | Analytical value (mass %) | | | | Si/(Si + Ti) | Half-width (deg) | Initial charge capacity (mAh/g) | 2 Cy. discharge capacity (mAh/cm³) | 300 Cy. discharge capacity (mAh/cm³) | Capacity retention ratio (%) |
|---|---|---|---|---|---|---|---|---|---|---|---|---|---|---|
| | Si | Ti | C | B | Si | Ti | C | B | | | | | | |
| Example 5-1 | 76 | 4 | 10 | 10 | 75.2 | 4 | 9.9 | 9.9 | 95 | 2.5 | 2265 | 142 | 84 | 59 |
| Example 5-2 | 72 | 8 | 10 | 10 | 71.3 | 7.9 | 9.9 | 9.9 | 90 | 2.9 | 2203 | 145 | 102 | 70 |
| Example 1-3 | 68 | 12 | 10 | 10 | 67.3 | 11.9 | 9.9 | 9.9 | 85 | 3.2 | 2143 | 152 | 114 | 75 |
| Example 5-3 | 64 | 16 | 10 | 10 | 63.4 | 15.8 | 9.9 | 9.9 | 80 | 3.4 | 2055 | 140 | 106 | 76 |
| Example 5-4 | 60 | 20 | 10 | 10 | 59.4 | 19.8 | 9.9 | 9.9 | 75 | 3.6 | 1910 | 115 | 87 | 76 |
| Example 5-5 | 56 | 24 | 10 | 10 | 55.4 | 23.8 | 9.9 | 9.9 | 70 | 3.7 | 1638 | 103 | 79 | 77 |
| Comparative example 5-1 | 78.4 | 1.6 | 10 | 10 | 77.6 | 1.6 | 9.9 | 9.9 | 98 | 0.6 | 2308 | 135 | 32 | 24 |
| Comparative example 5-2 | 52 | 28 | 10 | 10 | 51.5 | 27.7 | 9.9 | 9.9 | 65 | 3.8 | 1201 | 70 | 54 | 77 |
| Comparative example 5-3 | 48 | 32 | 10 | 10 | 47.5 | 31.7 | 9.9 | 9.9 | 60 | 3.9 | 1023 | 65 | 50 | 77 |
| Comparative example 5-4 | 44 | 36 | 10 | 10 | 43.6 | 35.6 | 9.9 | 9.9 | 55 | 3.9 | 941 | 57 | 44 | 78 |

As Comparative examples 5-1 to 5-4 relative to Examples 5-1 to 5-5, anode active materials and secondary batteries were formed in the same manner as that in Examples 5-1 to 5-5, except that Si/(Si+Ti) was changed as shown in Table 5.

For the anode active materials of Examples 5-1 to 5-5 and Comparative examples 5-1 to 5-4, the composition thereof was analyzed and the half-width was measured in the same manner as that in Examples 1-1 to 1-5. The results are shown in Table 5. Further, for the secondary batteries, the initial charge capacity and the cycle characteristics were examined in the same manner as that in Examples 1-1 to 1-5. The results are shown in Table 5 and FIG. 11.

Figure 11:
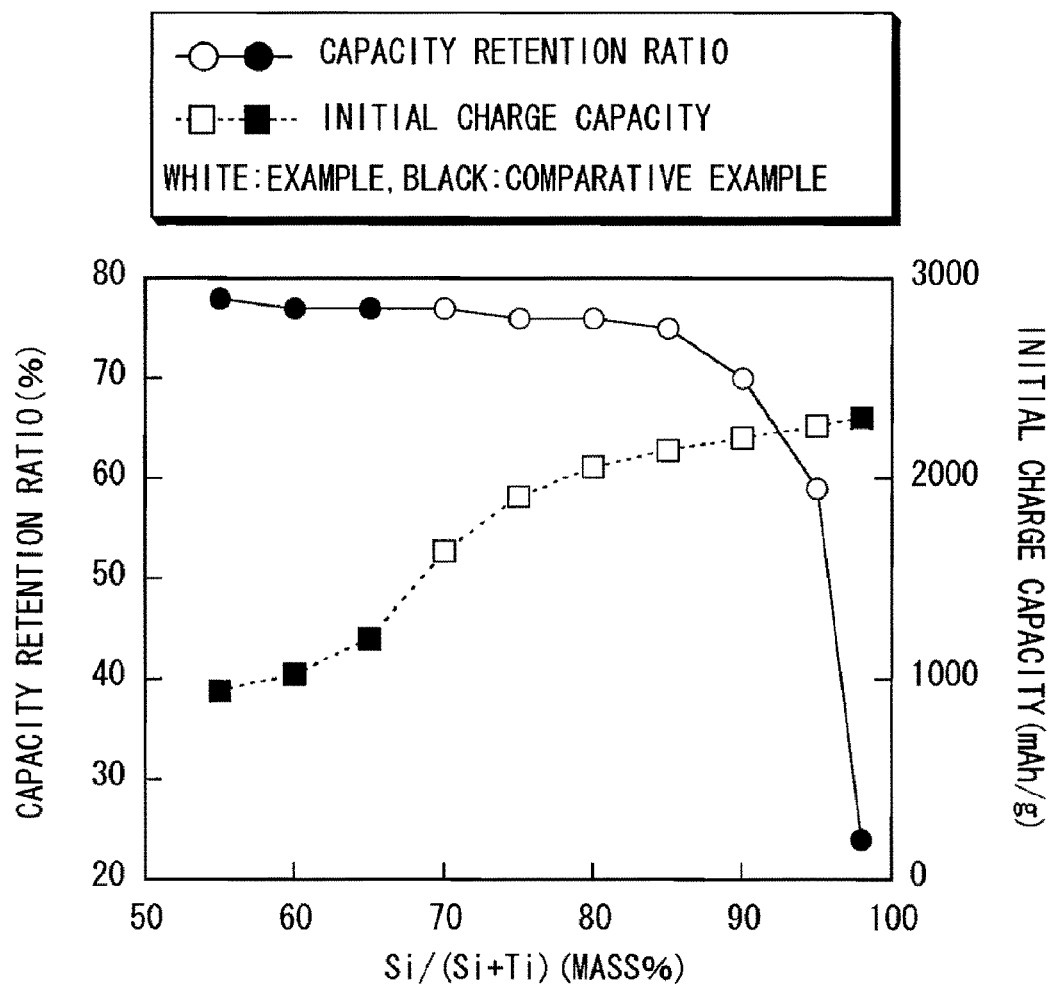
FIG. 11 is another characteristic diagram illustrating a relation between the ratio of the silicon content to the total of the silicon content and the titanium content, the capacity retention ratio and the initial charge capacity.

As evidenced by Table 5 and FIG. 11, results similar to those of Table 4 and Table 10 were obtained. That is, in Examples 5-1 to 5-5 in which Si/(Si+Ti) was from 70 mass % to 95 mass % both inclusive, the capacity retention ratio was more dramatically improved than that of Comparative example 5-1 in which Si/(Si+Ti) was over 95 mass %, and the initial charge capacity was more dramatically improved than that of Comparative examples 5-2 to 5-4 in which Si/(Si+Ti) was under 70 mass %. In particular, in the case where Si/(Si+Ti) was from 80 mass % to 90 mass % both inclusive, a high initial charge capacity and a high capacity retention ratio were obtained.

That is, it was found that in the case where the total of carbon content and boron content was 19.8 mass %, the capacity and the cycle characteristics were able to be improved when Si/(Si+Ti) was from 70 mass % to 95 mass % both inclusive. In addition, it was also found that Si/(Si+Ti) was more preferably from 80 mass % to 90 mass % both inclusive.

Examples 6-1 to 6-5

Anode active materials and secondary batteries were formed in the same manner as that in Examples 1-1 to 1-5, except that the raw material ratios of silicon, titanium, carbon, and boron were changed as shown in Table 6. Specifically, the total of raw material ratios of carbon and boron was set to the constant value of 30 mass %, and Si/(Si+Ti) was changed in the range from 70 mass % to 95 mass % both inclusive.

TABLE 6

C + B = 29.8 mass %

| | Raw material ratio (mass %) | | | | Analytical value (mass %) | | | | Si/(Si + Ti) | Half-width (deg) | Initial charge capacity (mAh/g) | 2 Cy. discharge capacity (mAh/cm³) | 300 Cy. discharge capacity (mAh/cm³) | Capacity retention ratio (%) |
|---|---|---|---|---|---|---|---|---|---|---|---|---|---|---|
| | Si | Ti | C | B | Si | Ti | C | B | | | | | | |
| Example 6-1 | 66.5 | 3.5 | 15 | 15 | 65.8 | 3.5 | 14.9 | 14.9 | 95 | 2.6 | 1976 | 133 | 69 | 52 |
| Example 6-2 | 63 | 7 | 15 | 15 | 62.4 | 6.9 | 14.9 | 14.9 | 90 | 3.2 | 1931 | 140 | 83 | 59 |
| Example 3-7 | 59.5 | 10.5 | 15 | 15 | 58.9 | 10.4 | 14.9 | 14.9 | 85 | 3.9 | 1884 | 142 | 87 | 61 |
| Example 6-3 | 56 | 14 | 15 | 15 | 55.4 | 13.9 | 14.9 | 14.9 | 80 | 4 | 1805 | 138 | 84 | 61 |
| Example 6-4 | 52.5 | 17.5 | 15 | 15 | 52 | 17.3 | 14.9 | 14.9 | 75 | 4.1 | 1752 | 123 | 76 | 62 |
| Example 6-5 | 49 | 21 | 15 | 15 | 48.5 | 20.8 | 14.9 | 14.9 | 70 | 4.1 | 1600 | 101 | 63 | 62 |
| Comparative example 6-1 | 68.6 | 1.4 | 15 | 15 | 67.9 | 1.4 | 14.9 | 14.9 | 98 | 0.6 | 2054 | 124 | 32 | 26 |
| Comparative example 6-2 | 45.5 | 24.5 | 15 | 15 | 45 | 24.3 | 14.9 | 14.9 | 65 | 4.2 | 1150 | 63 | 40 | 63 |
| Comparative example 6-3 | 42 | 28 | 15 | 15 | 41.6 | 27.7 | 14.9 | 14.9 | 60 | 4.2 | 943 | 51 | 33 | 64 |
| Comparative example 6-4 | 38.5 | 31.5 | 15 | 15 | 38.1 | 31.2 | 14.9 | 14.9 | 55 | 4.3 | 810 | 42 | 27 | 65 |

As Comparative examples 6-1 to 6-4 relative to Examples 6-1 to 6-5, anode active materials and secondary batteries were formed in the same manner as that in Examples 6-1 to 6-5, except that Si/(Si+Ti) was changed as shown in Table 6.

For the anode active materials of Examples 6-1 to 6-5 and Comparative examples 6-1 to 6-4, the composition thereof was analyzed and the half-width was measured in the same manner as that in Examples 1-1 to 1-5. The results are shown in Table 6. Further, for the secondary batteries, the initial charge capacity and the cycle characteristics were examined in the same manner as that in Examples 1-1 to 1-5. The results are shown in Table 6 and FIG. 12.

Figure 12:
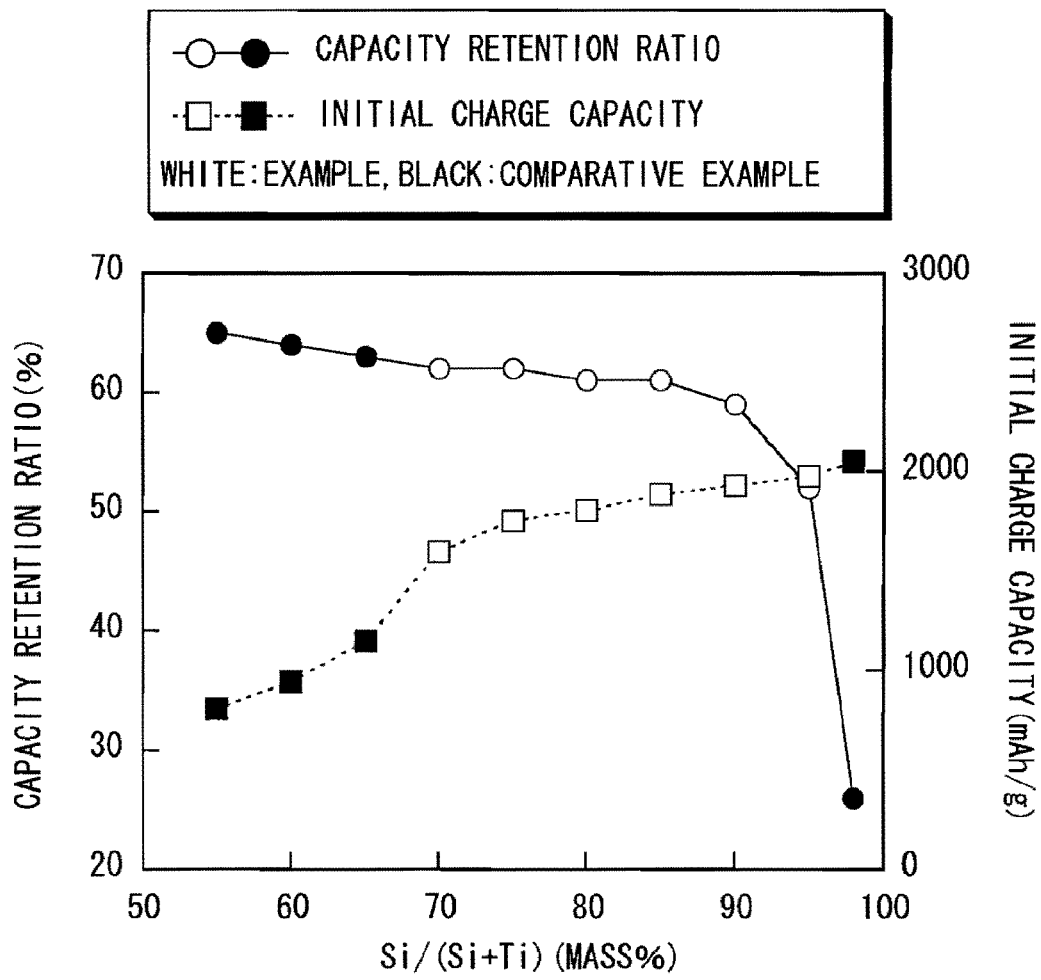
FIG. 12 is still another characteristic diagram illustrating a relation between the ratio of the silicon content to the total of the silicon content and the titanium content, the capacity retention ratio and the initial charge capacity.

As evidenced by Table 6 and FIG. 12, results similar to those of Table 4 and Table 10 were obtained. That is, in Examples 6-1 to 6-5 in which Si/(Si+Ti) was from 70 mass % to 95 mass % both inclusive, the capacity retention ratio was more dramatically improved than that of Comparative example 6-1 in which Si/(Si+Ti) was over 95 mass %, and the initial charge capacity was more dramatically improved than that of Comparative examples 6-2 to 6-4 in which Si/(Si+Ti) was under 70 mass %. In particular, in the case where Si/(Si+Ti) was from 80 mass % to 90 mass % both inclusive, a high initial charge capacity and a high capacity retention ratio were obtained.

That is, it was found that in the case where the total of carbon content and boron content was 29.8 mass %, the capacity and the cycle characteristics were able to be improved when Si/(Si+Ti) was from 70 mass % to 95 mass % both inclusive. In addition, it was also found that Si/(Si+Ti) was more preferably from 80 mass % to 90 mass % both inclusive.

From the results of Table 4 to Table 6 and FIGS. 10 to 12, it was found that in the case where Si/(Si+Ti) was from 70 mass % to 95 mass % both inclusive, the capacity and cycle characteristics were able to be improved irrespective of the total of carbon content and boron content.

Examples 7-1 to 7-4

Anode active materials and secondary batteries were formed in the same manner as that in Examples 1-1 to 1-5, except that the operation time and the rotational frequency in synthesizing the anode active material were changed and the half-width of the diffraction peak having a wide half-width observed in the range of 2θ=from 20 to 50 degree both inclusive was changed. In Examples 7-1 to 7-4, the raw material ratio of carbon was set to the constant value of 5 mass %, the raw material ratio of boron was set to the constant value of 5 mass %, and Si/(Si+Ti) was set to the constant value of 85 mass %, and the half-width was changed in the range from 1 degree to 4 degrees both inclusive.

TABLE 7

C + B = 9.8 mass %
Si/(Si + Ti) = 85 mass %

| | Raw material ratio (mass %) | | | | Analytical value (mass %) | | | | Half-width (deg) | Initial charge capacity (mAh/g) | 2 Cy. discharge capacity (mAh/cm³) | 300 Cy. discharge capacity (mAh/cm³) | Capacity retention ratio (%) |
|---|---|---|---|---|---|---|---|---|---|---|---|---|---|
| | Si | Ti | C | B | Si | Ti | C | B | | | | | |
| Example 7-1 | 76.5 | 13.5 | 5 | 5 | 75.7 | 13.4 | 4.9 | 4.9 | 1 | 2356 | 126 | 50 | 40 |
| Example 7-2 | 76.5 | 13.5 | 5 | 5 | 75.7 | 13.4 | 4.9 | 4.9 | 1.5 | 2326 | 130 | 64 | 49 |
| Example 3-1 | 76.5 | 13.5 | 5 | 5 | 75.7 | 13.4 | 4.9 | 4.9 | 2 | 2298 | 136 | 76 | 56 |
| Example 7-3 | 76.5 | 13.5 | 5 | 5 | 75.7 | 13.4 | 4.9 | 4.9 | 3 | 2245 | 135 | 80 | 59 |
| Example 7-4 | 76.5 | 13.5 | 5 | 5 | 75.7 | 13.4 | 4.9 | 4.9 | 4 | 2106 | 134 | 83 | 62 |
| Comparative example 7-1 | 76.5 | 13.5 | 5 | 5 | 75.7 | 13.4 | 4.9 | 4.9 | 0.4 | 2536 | 75 | 0 | 0 |
| Comparative example 7-2 | 76.5 | 13.5 | 5 | 5 | 75.7 | 13.4 | 4.9 | 4.9 | 0.6 | 2486 | 82 | 0 | 0 |
| Comparative example 7-3 | 76.5 | 13.5 | 5 | 5 | 75.7 | 13.4 | 4.9 | 4.9 | 0.8 | 2411 | 100 | 10 | 10 |

As Comparative examples 7-1 to 7-3 relative to Examples 7-1 to 7-4, anode active materials and secondary batteries were formed in the same manner as that in Examples 7-1 to 7-4, except that the half-width was changed as shown in Table 7.

For the anode active materials of Examples 7-1 to 7-4 and Comparative examples 7-1 to 7-3, the composition thereof was analyzed and the half-width was measured in the same manner as that in Examples 1-1 to 1-5. The results are shown in Table 7. Further, for the secondary batteries, the initial charge capacity and the cycle characteristics were examined in the same manner as that in Examples 1-1 to 1-5. The results are shown in Table 7 and FIG. 13.

Figure 13:
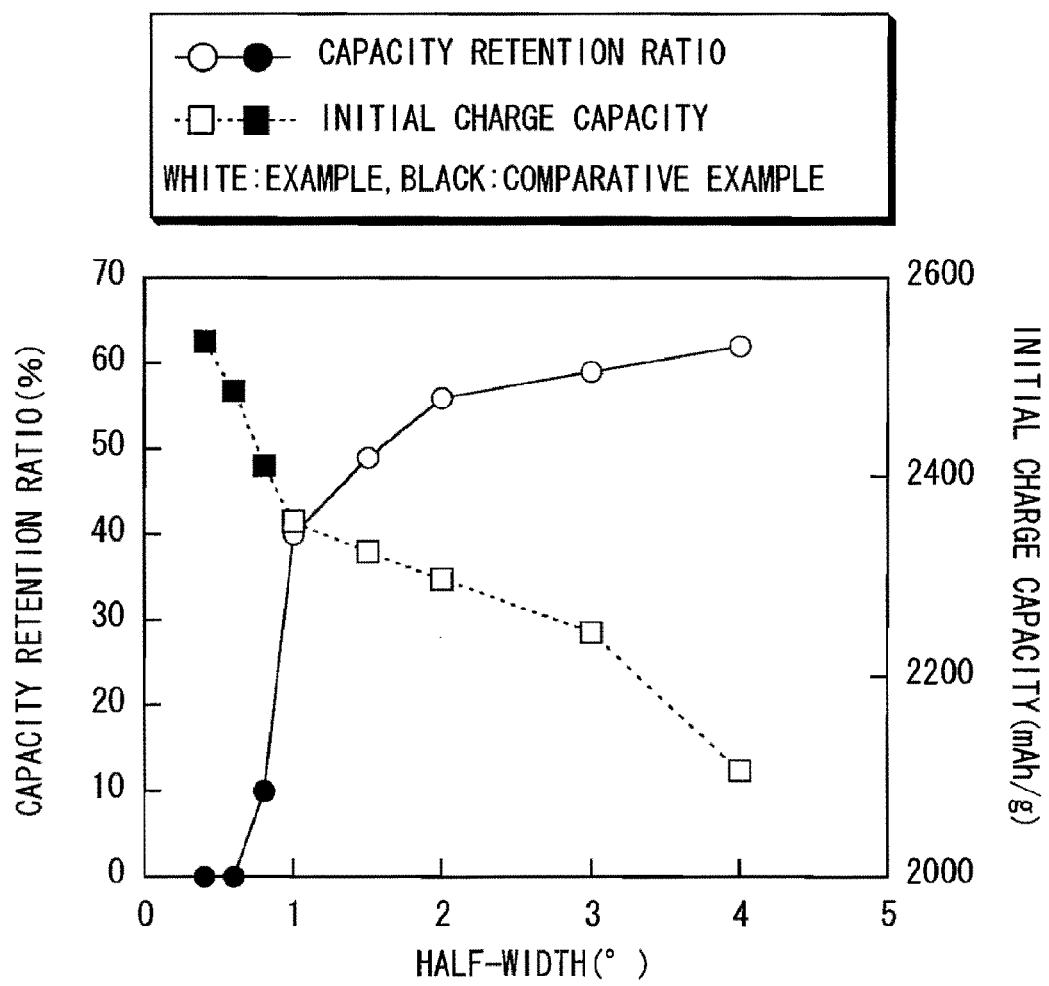
FIG. 13 is a characteristic diagram illustrating a relation between half-width, the capacity retention ratio and the initial charge capacity.

As evidenced by Table 7 and FIG. 13, in Examples 7-1 to 7-4 in which the half-width is 1 degree or more, the capacity retention ratio was dramatically improved than that of Comparative examples 7-1 to 7-3 in which the half-width is under 1 degree.

That is, it was found that in the case where the total of carbon content and boron content was 9.8 mass %, the capacity and the cycle characteristics were able to be improved if the half-width of the diffraction peak obtained by X-ray diffraction was 1 degree or more.

Examples 8-1 to 8-5

Anode active materials and secondary batteries were formed in the same manner as that in Examples 1-1 to 1-5, except that the raw material ratios of silicon, titanium, carbon, and boron were changed as shown in Table 8. In Examples 8-1 to 8-5, the raw material ratio of carbon was set to the constant value of 15 mass %, the raw material ratio of boron was set to the constant value of 15 mass %, and Si/(Si+Ti) was set to the constant value of 85 mass %, and the half-width was changed in the range from 1 degree to 4 degrees both inclusive.

TABLE 8

C + B = 29.8 mass %
Si/(Si + Ti) = 85 mass %

| | Raw material ratio (mass %) | | | | Analytical value (mass %) | | | | Half-width (deg) | Initial charge capacity (mAh/g) | 2 Cy. discharge capacity (mAh/cm³) | 300 Cy. discharge capacity (mAh/cm³) | Capacity retention ratio (%) |
|---|---|---|---|---|---|---|---|---|---|---|---|---|---|
| | Si | Ti | C | B | Si | Ti | C | B | | | | | |
| Example 8-1 | 59.5 | 10.5 | 15 | 15 | 58.9 | 10.4 | 14.9 | 14.9 | 1 | 2010 | 121 | 54 | 45 |
| Example 8-2 | 59.5 | 10.5 | 15 | 15 | 58.9 | 10.4 | 14.9 | 14.9 | 1.5 | 1968 | 135 | 68 | 50 |
| Example 8-3 | 59.5 | 10.5 | 15 | 15 | 58.9 | 10.4 | 14.9 | 14.9 | 2 | 1930 | 142 | 77 | 54 |
| Example 8-4 | 59.5 | 10.5 | 15 | 15 | 58.9 | 10.4 | 14.9 | 14.9 | 3 | 1908 | 145 | 84 | 58 |
| Example 3-7 | 59.5 | 10.5 | 15 | 15 | 58.9 | 10.4 | 14.9 | 14.9 | 3.9 | 1884 | 142 | 87 | 61 |
| Example 8-5 | 59.5 | 10.5 | 15 | 15 | 58.9 | 10.4 | 14.9 | 14.9 | 4 | 1878 | 142 | 87 | 61 |
| Comparative example 8-1 | 59.5 | 10.5 | 15 | 15 | 58.9 | 10.4 | 14.9 | 14.9 | 0.5 | 2211 | 63 | 0 | 0 |
| Comparative example 8-2 | 59.5 | 10.5 | 15 | 15 | 58.9 | 10.4 | 14.9 | 14.9 | 0.7 | 2100 | 76 | 0 | 0 |
| Comparative example 8-3 | 59.5 | 10.5 | 15 | 15 | 58.9 | 10.4 | 14.9 | 14.9 | 0.9 | 2054 | 91 | 15 | 17 |

As Comparative examples 8-1 to 8-3 relative to Examples 8-1 to 8-5, anode active materials and secondary batteries were formed in the same manner as that in Examples 8-1 to 8-5, except that the half-width was changed as shown in Table 8.

For the anode active materials of Examples 8-1 to 8-5 and Comparative examples 8-1 to 8-3, the composition thereof was analyzed and the half-width was measured in the same manner as that in Examples 1-1 to 1-5. The results are shown in Table 8. Further, for the secondary batteries, the initial charge capacity and the cycle characteristics were examined in the same manner as that in Examples 1-1 to 1-5. The results are shown in Table 8 and FIG. 14.

Figure 14:
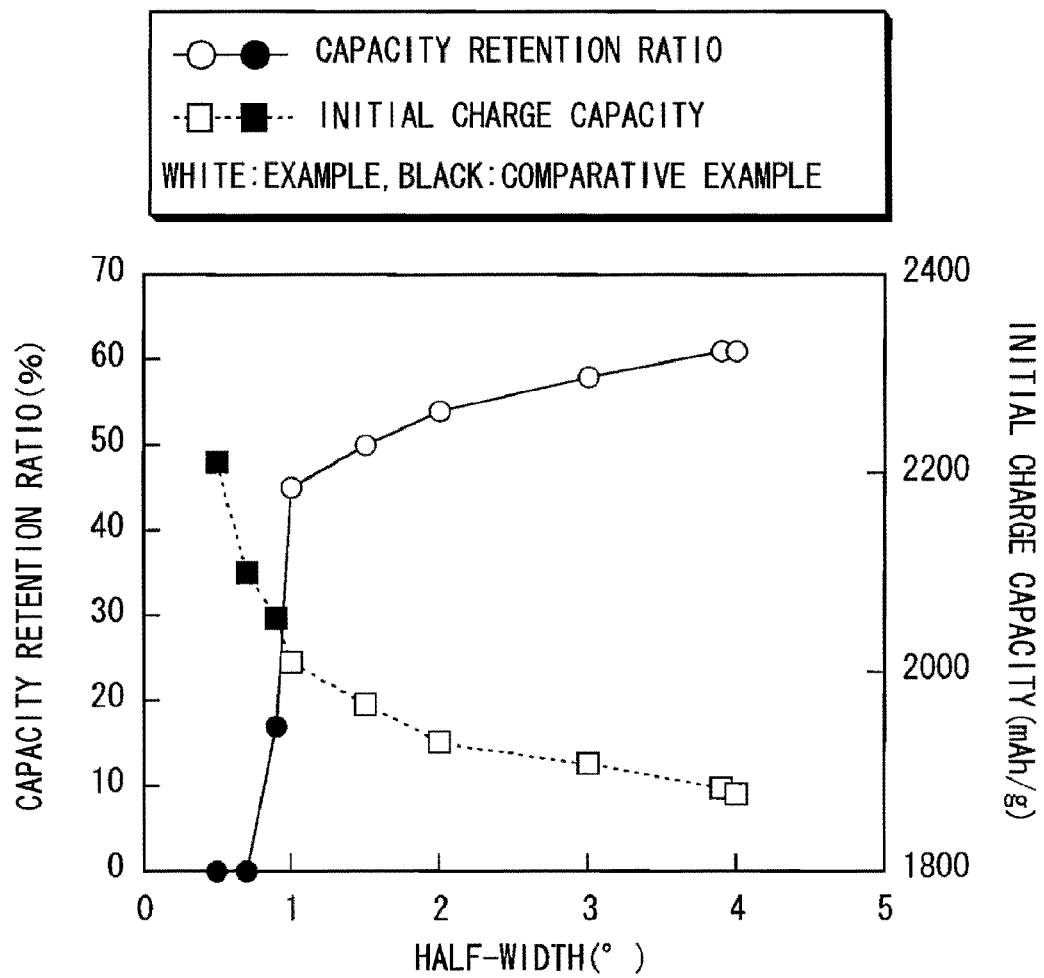
FIG. 14 is another characteristic diagram illustrating a relation between the half-width, the capacity retention ratio and the initial charge capacity.

As evidenced by Table 8 and FIG. 14, in Examples 8-1 to 8-5 in which the half-width was 1 degree or more, the capacity retention ratio was more dramatically improved than that of Comparative examples 8-1 to 8-3 in which the half-width was under 1 degree.

That is, it was found that in the case where the total of carbon content and boron content was 29.8 mass %, the capacity and the cycle characteristics were able to be improved if the half-width of the diffraction peak obtained by X-ray diffraction was 1 degree or more.

From the results of Table 7 and Table 8 and FIG. 13 and FIG. 14, it was found that in the case where the half-width was 1 degree or more, the capacity and the cycle characteristics were able to be improved irrespective of the total of carbon content and boron content.

Examples 9-1 to 9-6

Anode active materials and secondary batteries were formed in the same manner as that in Examples 1-1 to 1-5, except that cobalt powder was used instead of titanium powder as a raw material, and the raw material ratios of silicon, cobalt, carbon, and boron were changed as shown in Table 9. Specifically, the raw material ratio of carbon was set to the constant value of 10 mass %, the raw material ratio of boron was set to the constant value of 10 mass %, the total of raw material ratios of carbon and boron was set to the constant value of 20 mass %, and the raw material ratio of silicon to the total of raw material ratios of silicon and cobalt (hereinafter referred to as "Si/(Si+Co)") was changed in the range from 70 mass % to 95 mass % both inclusive. For the secondary batteries of Examples 9-1 to 9-6, the composition thereof was analyzed in the same manner as that in Examples 1-1 to 1-5. The results are shown in Table 9. Further, for the secondary batteries, the initial charge capacity and the cycle characteristics were examined in the same manner as that in Examples 1-1 to 1-5. The results are shown in Table 9 and FIG. 15.

TABLE 9

C + B = 19.8 mass %

| | Raw material ratio (mass %) | | | | Analytical value (mass %) | | | | Si/(Si + Co) | Half-width (deg) | Initial charge capacity (mAh/g) | 2 Cy. discharge capacity (mAh/cm³) | 300 Cy. discharge capacity (mAh/cm³) | Capacity retention ratio (%) |
|---|---|---|---|---|---|---|---|---|---|---|---|---|---|---|
| | Si | Co | C | B | Si | Co | C | B | | | | | | |
| Example 9-1 | 76 | 4 | 10 | 10 | 75.2 | 4 | 9.9 | 9.9 | 95 | 2.6 | 2255 | 141 | 82 | 58 |
| Example 9-2 | 72 | 8 | 10 | 10 | 71.3 | 7.9 | 9.9 | 9.9 | 90 | 3 | 2198 | 144 | 102 | 71 |
| Example 9-3 | 68 | 12 | 10 | 10 | 67.3 | 11.9 | 9.9 | 9.9 | 85 | 3.1 | 2135 | 151 | 115 | 76 |
| Example 9-4 | 64 | 16 | 10 | 10 | 63.4 | 15.8 | 9.9 | 9.9 | 80 | 3.5 | 2045 | 139 | 107 | 77 |
| Example 9-5 | 60 | 20 | 10 | 10 | 59.4 | 19.8 | 9.9 | 9.9 | 75 | 3.6 | 1900 | 114 | 88 | 77 |
| Example 9-6 | 56 | 24 | 10 | 10 | 55.4 | 23.8 | 9.9 | 9.9 | 70 | 3.8 | 1624 | 102 | 80 | 78 |
| Comparative example 9-1 | 78.4 | 1.6 | 10 | 10 | 77.6 | 1.6 | 9.9 | 9.9 | 98 | 0.6 | 2295 | 134 | 34 | 25 |
| Comparative example 9-2 | 52 | 28 | 10 | 10 | 51.5 | 27.7 | 9.9 | 9.9 | 65 | 3.9 | 1189 | 70 | 55 | 78 |

TABLE 9-continued

C + B = 19.8 mass %

| | Raw material ratio (mass %) | | | | Analytical value (mass %) | | | | Si/(Si + Co) | Half-width (deg) | Initial charge capacity (mAh/g) | 2 Cy. discharge capacity (mAh/cm³) | 300 Cy. discharge capacity (mAh/cm³) | Capacity retention ratio (%) |
|---|---|---|---|---|---|---|---|---|---|---|---|---|---|---|
| | Si | Co | C | B | Si | Co | C | B | | | | | | |
| Comparative example 9-3 | 48 | 32 | 10 | 10 | 47.5 | 31.7 | 9.9 | 9.9 | 60 | 3.9 | 1015 | 64 | 50 | 78 |
| Comparative example 9-4 | 44 | 36 | 10 | 10 | 43.6 | 35.6 | 9.9 | 9.9 | 55 | 3.9 | 925 | 56 | 44 | 79 |

As Comparative examples 9-1 to 9-4 relative to Examples 9-1 to 9-6, anode active materials and secondary batteries were formed in the same manner as that in Examples 9-1 to 9-6, except that Si/(Si+Co) was changed as shown in Table 9.

Figure 15:
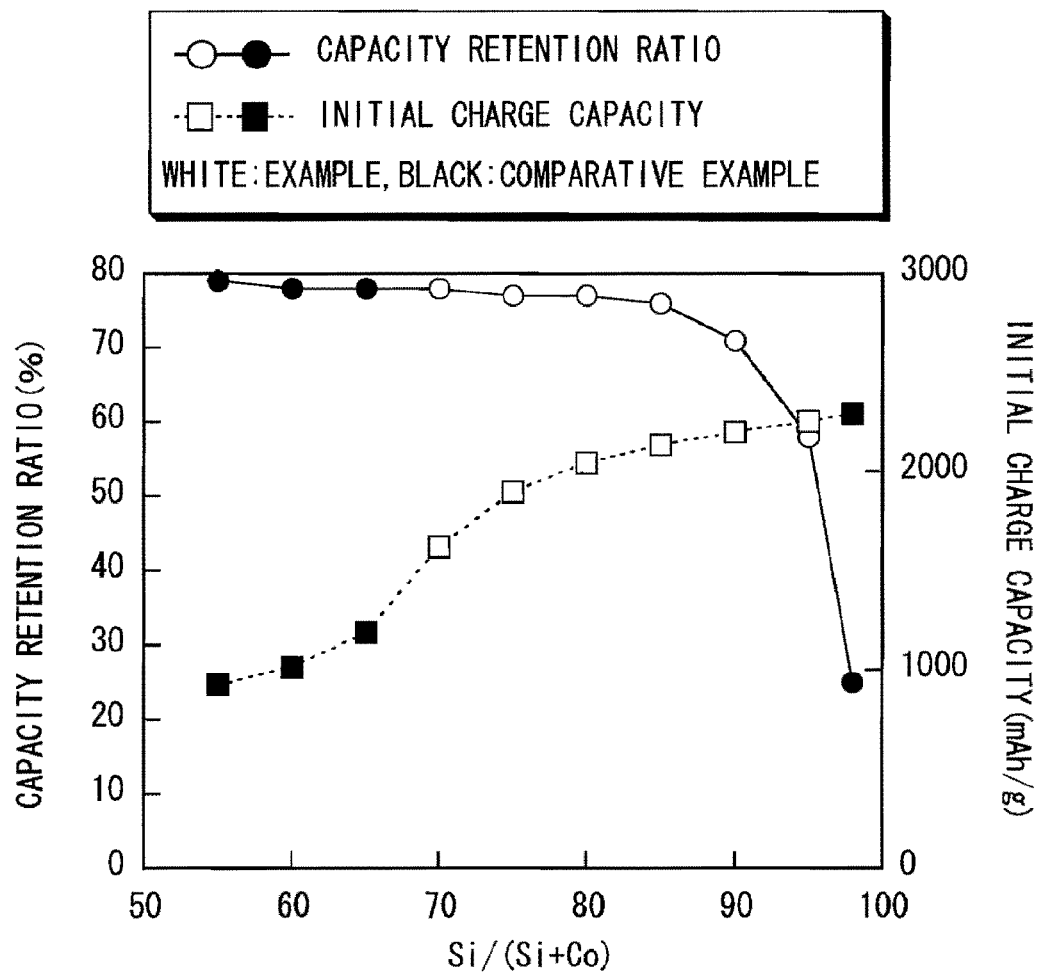
FIG. 15 is a characteristic diagram illustrating a relation between the ratio of the silicon content to the total of the silicon content and a cobalt content, the capacity retention ratio and the initial charge capacity.

As evidenced by Table 9 and FIG. 15, in Examples 9-1 to 9-6 in which Si/(Si+Co) was from 70 mass % to 95 mass % both inclusive, the capacity retention ratio was more dramatically improved than that of Comparative example 9-1 in which Si/(Si+Co) was over 95 mass %, and the initial charge capacity was more dramatically improved than that of Comparative examples 9-2 to 9-4 in which Si/(Si+Co) was under mass %. In particular, in the case where Si/(Si+Co) was from 80 mass % to 90 mass % both inclusive, a high initial charge capacity and a high capacity retention ratio were obtained.

That is, it was found that in the case where Si/(Si+Co) was from 70 mass % to 95 mass % both inclusive, the capacity and the cycle characteristics were able to be improved. In addition, it was also found that Si/(Si+Co) was more preferably from 80 mass % to 90 mass % both inclusive.

Examples 10-1 to 10-6

Anode active materials and secondary batteries were formed in the same manner as that in Examples 1-1 to 1-5, except that iron powder was used instead of titanium powder as a raw material, and the raw material ratios of silicon, iron, carbon, and boron were changed as shown in Table 10. Specifically, the raw material ratio of carbon was set to the constant value of 10 mass %, the raw material ratio of boron was set to the constant value of 10 mass %, the total of raw material ratios of carbon and boron was set to the constant value of 20 mass %, and the raw material ratio of silicon to the total of raw material ratios of silicon and iron (hereinafter referred to as "Si/(Si+Fe)") was changed in the range from 70 mass % to 95 mass % both inclusive. For the secondary batteries of Examples 10-1 to 10-6, the composition thereof was analyzed in the same manner as that in Examples 1-1 to 1-5. The results are shown in Table 10. Further, for the secondary batteries, the initial charge capacity and the cycle characteristics were examined in the same manner as that in Examples 1-1 to 1-5. The results are shown in Table 10 and FIG. 16.

TABLE 10

C + B = 19.8 mass %

| | Raw material ratio (mass %) | | | | Analytical value (mass %) | | | | Si/(Si + Fe) | Half-width (deg) | Initial charge capacity (mAh/g) | 2 Cy. discharge capacity (mAh/cm³) | 300 Cy. discharge capacity (mAh/cm³) | Capacity retention ratio (%) |
|---|---|---|---|---|---|---|---|---|---|---|---|---|---|---|
| | Si | Fe | C | B | Si | Fe | C | B | | | | | | |
| Example 10-1 | 76 | 4 | 10 | 10 | 75.2 | 4 | 9.9 | 9.9 | 95 | 2.4 | 2251 | 140 | 83 | 59 |
| Example 10-2 | 72 | 8 | 10 | 10 | 71.3 | 7.9 | 9.9 | 9.9 | 90 | 2.8 | 2201 | 143 | 103 | 72 |
| Example 10-3 | 68 | 12 | 10 | 10 | 67.3 | 11.9 | 9.9 | 9.9 | 85 | 2.9 | 2146 | 150 | 116 | 77 |
| Example 10-4 | 64 | 16 | 10 | 10 | 63.4 | 15.8 | 9.9 | 9.9 | 80 | 3.3 | 2050 | 138 | 106 | 77 |
| Example 10-5 | 60 | 20 | 10 | 10 | 59.4 | 19.8 | 9.9 | 9.9 | 75 | 3.3 | 1903 | 113 | 88 | 78 |
| Example 10-6 | 56 | 24 | 10 | 10 | 55.4 | 23.8 | 9.9 | 9.9 | 70 | 3.5 | 1625 | 101 | 80 | 79 |
| Comparative example 10-1 | 78.4 | 1.6 | 10 | 10 | 77.6 | 1.6 | 9.9 | 9.9 | 98 | 0.4 | 2298 | 134 | 35 | 26 |
| Comparative example 10-2 | 52 | 28 | 10 | 10 | 51.5 | 27.7 | 9.9 | 9.9 | 65 | 3.6 | 1192 | 68 | 54 | 79 |
| Comparative example 10-3 | 48 | 32 | 10 | 10 | 47.5 | 31.7 | 9.9 | 9.9 | 60 | 3.6 | 1013 | 61 | 48 | 79 |
| Comparative example 10-4 | 44 | 36 | 10 | 10 | 43.6 | 35.6 | 9.9 | 9.9 | 55 | 3.6 | 934 | 54 | 43 | 80 |

As Comparative examples 10-1 to 10-4 relative to Examples 10-1 to 10-6, anode active materials and secondary batteries were formed in the same manner as that in Examples 10-1 to 10-6, except that Si/(Si+Fe) was changed as shown in Table 10.

Figure 16:
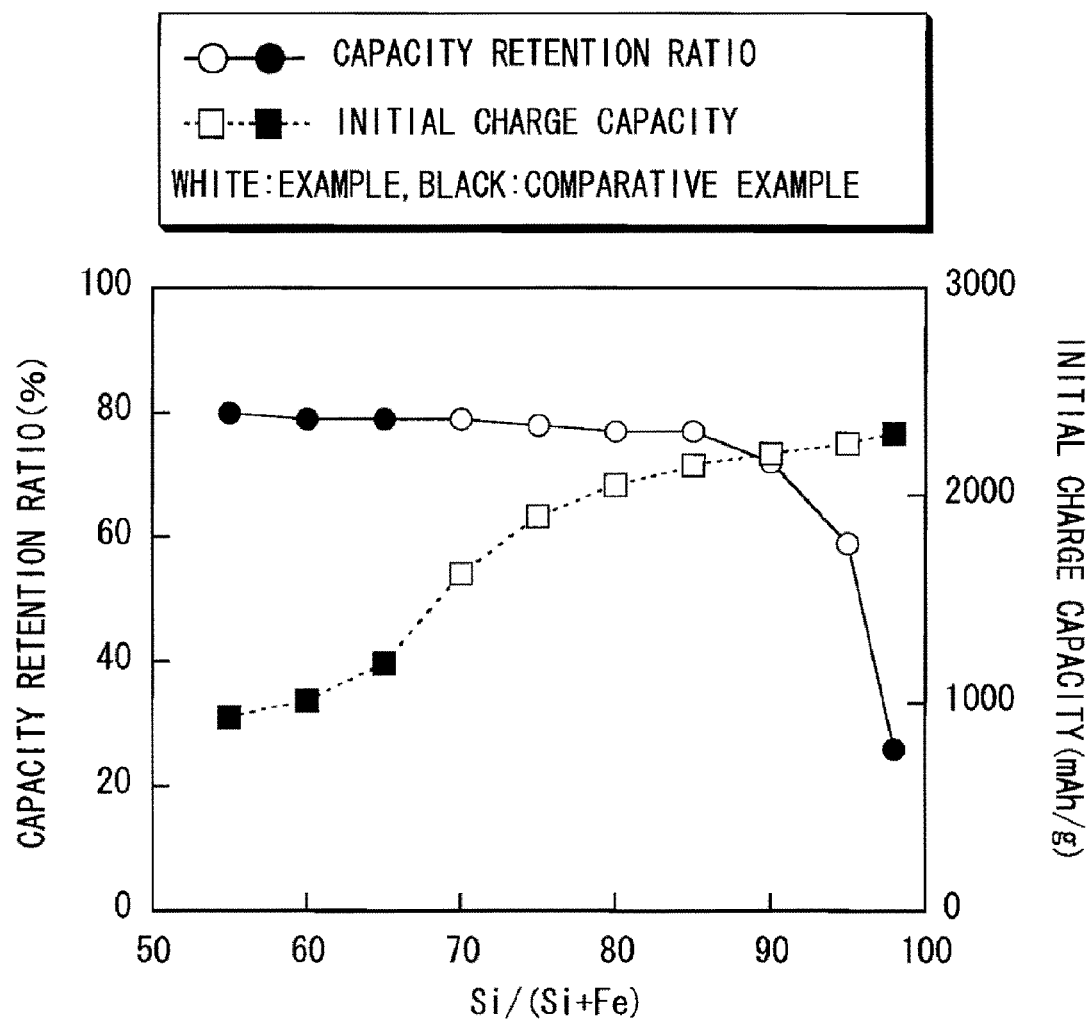
FIG. 16 is a characteristic diagram illustrating a relation between the ratio of silicon content to the total of the silicon content and an iron content, the capacity retention ratio and the initial charge capacity.

As evidenced by Table 10 and FIG. 16, in Examples 10-1 to 10-6 in which Si/(Si+Fe) was from 70 mass % to 95 mass % both inclusive, the capacity retention ratio was more dramatically improved than that of Comparative example 10-1 in which Si/(Si+Fe) was over 95 mass %, and the initial charge capacity was more dramatically improved than that of Comparative examples 10-2 to 10-4 in which Si/(Si+Fe) was under 70 mass %. In particular, in the case where Si/(Si+Fe) was from 80 mass % to 90 mass % both inclusive, a high initial charge capacity and a high capacity retention ratio were obtained.

That is, it was found that in the case where Si/(Si+Fe) was from 70 mass % to 95 mass % both inclusive, the capacity and the cycle characteristics were able to be improved. In addition, it was also found that Si/(Si+Fe) was more preferably from 80 mass % to 90 mass % both inclusive.

From the results of Table 4, Table 9, and Table 10 and FIG. 10, FIG. 15, and FIG. 16, it was found that in the case where Si/(Si+Ti), Si/(Si+Co), or Si/(Si+Fe) was from 70 mass % to 95 mass % both inclusive, the capacity and the cycle characteristics were able to be improved irrespective of the type of the metal element (titanium, cobalt, or iron) contained in the anode active material.

Examples 11-1 to 11-12

Anode active materials and secondary batteries were formed in the same manner as that in Examples 1-1 to 1-5, except that the raw material ratios of silicon, a metal element (titanium, cobalt, or iron), carbon, and boron were changed as shown in Table 11. Specifically, the raw material ratio of carbon was set to the constant value of 10 mass %, the raw material ratio of boron was set to the constant value of 10 mass %, the total raw material ratios of carbon and boron was set to the constant value of 20 mass %, and other two or three metal elements were combined therewith. For the secondary batteries of Examples 11-1 to 11-12, the composition thereof was analyzed in the same manner as that in Examples 1-1 to 1-5. The results are shown in Table 11. Further, for the secondary batteries, the initial charge capacity and the cycle characteristics were examined in the same manner as that in Examples 1-1 to 1-5. The results are shown in Table 12.

TABLE 11

C + B = 19.8 mass %

| | Raw material ratio (mass %) | | | | | | Analytical value (mass %) | | | | | | Half-width |
|---|---|---|---|---|---|---|---|---|---|---|---|---|---|
| | Si | Ti | Co | Fe | C | B | Si | Ti | Co | Fe | C | B | (deg) |
| Example 5-2 | 72 | 8 | — | — | 10 | 10 | 71.3 | 7.9 | — | — | 9.9 | 9.9 | 2.9 |
| Example 9-2 | 72 | — | 8 | — | 10 | 10 | 71.3 | — | 7.9 | — | 9.9 | 9.9 | 3 |
| Example 10-2 | 72 | — | — | 8 | 10 | 10 | 71.3 | — | — | 7.9 | 9.9 | 9.9 | 2.8 |
| Example 11-1 | 72 | 4 | 4 | — | 10 | 10 | 71.3 | 4 | 4 | — | 9.9 | 9.9 | 2.9 |
| Example 11-2 | 72 | 4 | — | 4 | 10 | 10 | 71.3 | 4 | — | 4 | 9.9 | 9.9 | 2.9 |
| Example 11-3 | 72 | — | 4 | 4 | 10 | 10 | 71.3 | — | 4 | 4 | 9.9 | 9.9 | 2.9 |
| Example 11-4 | 72 | 3 | 3 | 2 | 10 | 10 | 71.3 | 3 | 3 | 2 | 9.9 | 9.9 | 2.9 |
| Example 5-3 | 64 | 16 | — | — | 10 | 10 | 63.4 | 15.8 | — | — | 9.9 | 9.9 | 3.4 |
| Example 9-4 | 64 | — | 16 | — | 10 | 10 | 63.4 | — | 15.8 | — | 9.9 | 9.9 | 3.5 |
| Example 10-4 | 64 | — | — | 16 | 10 | 10 | 63.4 | — | — | 15.8 | 9.9 | 9.9 | 3.3 |
| Example 11-5 | 64 | 8 | — | 8 | 10 | 10 | 63.4 | 7.9 | — | 7.9 | 9.9 | 9.9 | 3.4 |
| Example 11-6 | 64 | 8 | 8 | — | 10 | 10 | 63.4 | 7.9 | 7.9 | — | 9.9 | 9.9 | 3.4 |
| Example 11-7 | 64 | — | 8 | 8 | 10 | 10 | 63.4 | — | 7.9 | 7.9 | 9.9 | 9.9 | 3.5 |
| Example 11-8 | 64 | 5 | 5 | 6 | 10 | 10 | 63.4 | 5 | 5 | 5.9 | 9.9 | 9.9 | 3.6 |
| Example 5-5 | 56 | 24 | — | — | 10 | 10 | 55.4 | 23.8 | — | — | 9.9 | 9.9 | 3.7 |
| Example 9-6 | 56 | — | 24 | — | 10 | 10 | 55.4 | — | 23.8 | — | 9.9 | 9.9 | 3.8 |
| Example 10-6 | 56 | — | — | 24 | 10 | 10 | 55.4 | — | — | 23.8 | 9.9 | 9.9 | 3.5 |
| Example 11-9 | 56 | 12 | 12 | — | 10 | 10 | 55.4 | 11.9 | 11.9 | — | 9.9 | 9.9 | 3.7 |
| Example 11-10 | 56 | 12 | — | 12 | 10 | 10 | 55.4 | 11.9 | — | 11.9 | 9.9 | 9.9 | 3.7 |
| Example 11-11 | 56 | — | 12 | 12 | 10 | 10 | 55.4 | — | 11.9 | 11.9 | 9.9 | 9.9 | 3.6 |
| Example 11-12 | 56 | 8 | 8 | 8 | 10 | 10 | 55.4 | 7.9 | 7.9 | 7.9 | 9.9 | 9.9 | 3.7 |

TABLE 12

C + B = 19.8 mass %

| | Initial charge capacity (mAh/g) | 2 Cy. discharge capacity (mAh/g) | 300 Cy. discharge capacity (mAh/g) | Capacity retention ratio (%) |
|---|---|---|---|---|
| Example 5-2 | 2203 | 145 | 102 | 70 |
| Example 9-2 | 2198 | 144 | 102 | 71 |
| Example 10-2 | 2201 | 143 | 103 | 72 |
| Example 11-1 | 2201 | 146 | 102 | 70 |
| Example 11-2 | 2205 | 145 | 102 | 70 |
| Example 11-3 | 2201 | 144 | 102 | 71 |
| Example 11-4 | 2146 | 145 | 103 | 71 |
| Example 5-3 | 2055 | 140 | 106 | 76 |
| Example 9-4 | 2045 | 139 | 107 | 77 |
| Example 10-4 | 2050 | 138 | 106 | 77 |
| Example 11-5 | 2050 | 140 | 106 | 76 |
| Example 11-6 | 2052 | 139 | 104 | 75 |
| Example 11-7 | 2053 | 140 | 106 | 76 |
| Example 11-8 | 2051 | 140 | 108 | 77 |
| Example 5-5 | 1638 | 103 | 79 | 77 |
| Example 9-6 | 1624 | 102 | 80 | 78 |
| Example 10-6 | 1625 | 101 | 80 | 79 |
| Example 11-9 | 1635 | 103 | 79 | 77 |
| Example 11-10 | 1633 | 102 | 80 | 78 |
| Example 11-11 | 1641 | 103 | 79 | 77 |
| Example 11-12 | 1636 | 103 | 80 | 78 |

As evidenced by Table 11 and FIG. 12, in Examples 11-1 to 11-12 in which the combination of two or more metal elements (titanium, cobalt, or iron) was used, an initial charge capacity and a capacity retention ratio almost equal to those of Examples 5-2, 9-2, 10-2 and the like in which a metal element was used singly were obtained based on every combination of the metal elements.

That is, it was found that a metal element was at least one of titanium, cobalt, and iron, the capacity and the cycle characteristics were able to be improved irrespective of the combination of metal elements.

Examples 12-1 to 12-17

Anode active materials and secondary batteries were formed in the same manner as that in Examples 1-1 to 1-5, except that 4-fluoro-1,3-dioxolane-2-one (FEC) as a solvent was added to an electrolytic solution, and the composition of the whole solvent was changed as shown in Table 13. The raw material ratio of carbon was set to the constant value of 10 mass %, the raw material ratio of boron was set to the constant value of 10 mass %, the total of raw material ratios of carbon and boron was set to the constant value of 20 mass %, Si/(Si+ Ti) was set to the constant value of 85 mass %, and the half-width was set to the constant value of 3.2 degrees, and the FEC content was changed in the range from 0.1 mass % to 90 mass % both inclusive. For the secondary batteries of Examples 12-1 to 12-17, the composition thereof was analyzed in the same manner as that in Examples 1-1 to 1-5. The results are shown in Table 13. Further, for the secondary batteries, the cycle characteristics were examined in the same manner as that in Examples 1-1 to 1-5. The results are shown in Table 13 and FIG. 17.

content thereof was preferably from 0.5 mass % to 70 mass % both inclusive, and more preferably from 20 mass % to 60 mass % both inclusive.

As evidenced by the results shown in Table 1 to Table 13 and FIG. 7 to FIG. 17, the following was confirmed. That is, in the case where the anode active material contained at least one metal element of silicon, boron, carbon, cobalt, titanium, and iron as an element, the boron content was from 4.9 mass % to 19.8 mass % both inclusive, the carbon content was from 4.9 mass % to 19.8 mass % both inclusive, and the total of boron content and carbon content was from 9.8 mass % to 29.8 mass % both inclusive, the ratio of silicon content to the total of silicon content and a metal element content was from 70 mass % to 95 mass % both inclusive, the anode active material was able to be reacted with an electrode reactant, and the anode active material has an reaction phase in which the half-width of the diffraction peak obtained by X-ray diffraction was 1 degree or more, the capacity and the cycle characteristics were improved.

The invention has been described with reference to the embodiment and the examples. However, the invention is not limited to the aspects described in the foregoing embodiment and the foregoing examples, and various modifications may be made. For example, in the foregoing embodiment and the foregoing examples, the description has been given of the

TABLE 13

$C + B = 19.8$ mass %
$Si/(Si + Ti) = 85$ mass %
Half-width = 3.2 degrees

| | Raw material ratio (mass %) | | | | Analytical value (mass %) | | | | Solvent (mass %) | | | | Capacity retention ratio |
|---|---|---|---|---|---|---|---|---|---|---|---|---|---|
| | Si | Ti | C | B | Si | Ti | C | B | FEC | EC | PC | DMC | (%) |
| Example 1-3 | 68 | 12 | 10 | 10 | 67.3 | 11.9 | 9.9 | 9.9 | — | 30 | 20 | 50 | 75 |
| Example 12-1 | 68 | 12 | 10 | 10 | 67.3 | 11.9 | 9.9 | 9.9 | 0.1 | 29.9 | 20 | 50 | 76 |
| Example 12-2 | 68 | 12 | 10 | 10 | 67.3 | 11.9 | 9.9 | 9.9 | 0.5 | 29.5 | 20 | 50 | 80 |
| Example 12-3 | 68 | 12 | 10 | 10 | 67.3 | 11.9 | 9.9 | 9.9 | 1 | 29 | 20 | 50 | 83 |
| Example 12-4 | 68 | 12 | 10 | 10 | 67.3 | 11.9 | 9.9 | 9.9 | 5 | 25 | 20 | 50 | 84 |
| Example 12-5 | 68 | 12 | 10 | 10 | 67.3 | 11.9 | 9.9 | 9.9 | 10 | 20 | 20 | 50 | 87 |
| Example 12-6 | 68 | 12 | 10 | 10 | 67.3 | 11.9 | 9.9 | 9.9 | 15 | 15 | 20 | 50 | 89 |
| Example 12-7 | 68 | 12 | 10 | 10 | 67.3 | 11.9 | 9.9 | 9.9 | 20 | 10 | 20 | 50 | 90 |
| Example 12-8 | 68 | 12 | 10 | 10 | 67.3 | 11.9 | 9.9 | 9.9 | 25 | 5 | 20 | 50 | 91 |
| Example 12-9 | 68 | 12 | 10 | 10 | 67.3 | 11.9 | 9.9 | 9.9 | 30 | — | 20 | 50 | 92 |
| Example 12-10 | 68 | 12 | 10 | 10 | 67.3 | 11.9 | 9.9 | 9.9 | 35 | — | 10 | 55 | 94 |
| Example 12-11 | 68 | 12 | 10 | 10 | 67.3 | 11.9 | 9.9 | 9.9 | 40 | — | — | 60 | 95 |
| Example 12-12 | 68 | 12 | 10 | 10 | 67.3 | 11.9 | 9.9 | 9.9 | 50 | — | — | 50 | 93 |
| Example 12-13 | 68 | 12 | 10 | 10 | 67.3 | 11.9 | 9.9 | 9.9 | 60 | — | — | 40 | 91 |
| Example 12-14 | 68 | 12 | 10 | 10 | 67.3 | 11.9 | 9.9 | 9.9 | 65 | — | — | 35 | 87 |
| Example 12-15 | 68 | 12 | 10 | 10 | 67.3 | 11.9 | 9.9 | 9.9 | 70 | — | — | 30 | 84 |
| Example 12-16 | 68 | 12 | 10 | 10 | 67.3 | 11.9 | 9.9 | 9.9 | 80 | — | — | 20 | 79 |
| Example 12-17 | 68 | 12 | 10 | 10 | 67.3 | 11.9 | 9.9 | 9.9 | 90 | — | — | 10 | 55 |

Figure 17:
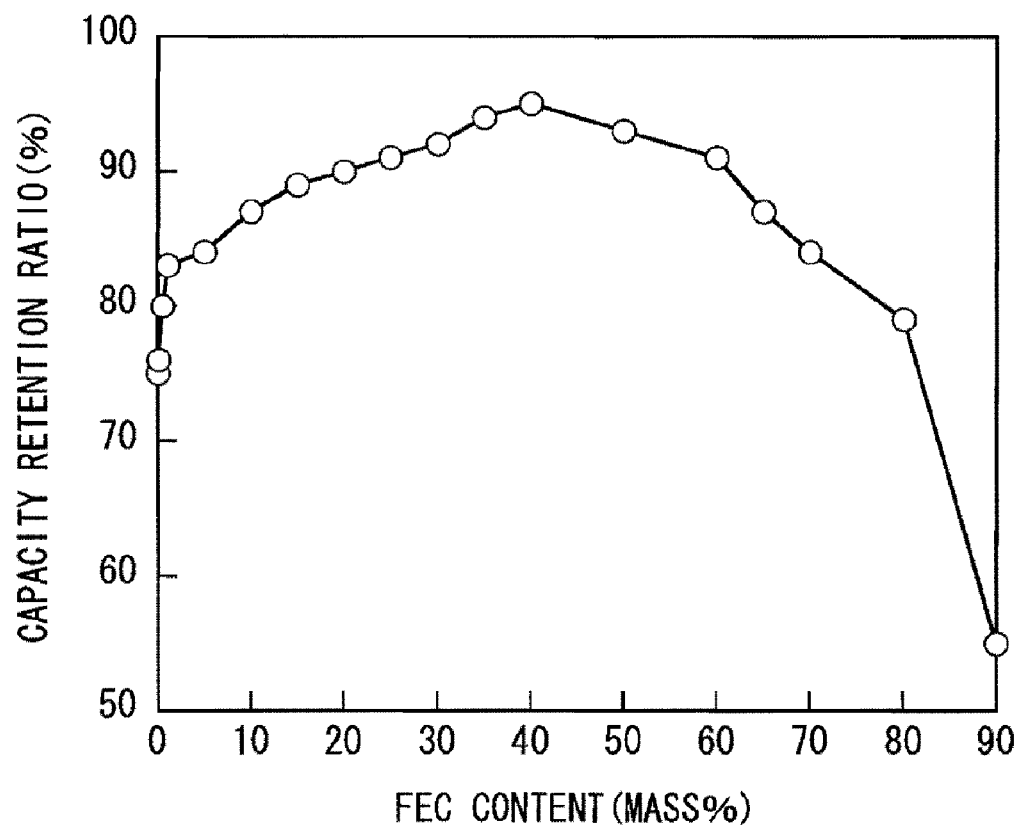
FIG. 17 is a characteristic diagram illustrating a relation between a FEC content and the capacity retention ratio.

As evidenced by Table 13 and FIG. 17, in Examples 12-1 to 12-17 in which FEC was contained, in the case where the FEC content was from 0.1 mass % to 80 mass % both inclusive, the capacity retention ratio was further improved than that of Example 1-3 in which FEC was not contained. In particular, in the case where the FEC content was from 0.5 mass % to 70 mass % both inclusive, more particularly from mass % to 60 mass % both inclusive, the capacity retention ratio was further improved.

That is, it was found that in the case where the cyclic ester carbonate derivative containing a halogen atom as an element was used as a solvent of the electrolyte, if the content was from 0.1 mass % to 80 mass % both inclusive, the cycle characteristics were able to be improved. It was also found the lithium ion secondary battery in which the anode capacity is expressed based on insertion and extraction of lithium as a secondary battery type. However, the secondary battery of the invention is not limited thereto. The secondary battery of the invention is similarly applicable to a secondary battery in which the anode capacity includes the capacity based on insertion and extraction of lithium and the capacity based on precipitation and dissolution of lithium, and the anode capacity is expressed by the sum of these capacities by setting the charge capacity of the anode material capable of inserting and extracting lithium smaller than the charge capacity of the cathode.

Further, in the foregoing embodiment and the foregoing examples, the description has been given with the specific examples of the case in which the battery structure is the cylindrical type, the laminated film type, the sheet type of the coin type and with the specific example in which the element structure has the spirally wound structure. However, the secondary battery of the invention is similarly applicable to a battery having other battery structure using a package member such as a button type and a square type or a battery having other element structure such as a lamination structure in which a plurality of cathodes and a plurality of anodes are layered.

Further, in the foregoing embodiment and the foregoing examples, the description has been given of the case using lithium as an electrode reactant. However, as an electrode reactant, other Group 1 element in the long period periodic table such as sodium (Na) and potassium (K), a Group 2 element in the long period periodic table such as magnesium (Mg) and calcium (Ca), other light metal such as aluminum, or lithium or alloys thereof may be used. The effects of the invention should be achieved irrespective of the type of the electrode reactant, and therefore, even if the type of the electrode reactant is changed, the same effects are obtained.

Further, in the foregoing embodiment and the foregoing examples, for the boron content in the anode or the secondary battery of the invention, the description has been given of the appropriate range derived from the results of the examples. However, the description does not totally deny a possibility that the content is out of the foregoing range. That is, the foregoing appropriate range is the range particularly preferable for obtaining the effects of the invention. Therefore, as long as effect of the invention is obtained, the content may be out of the foregoing range in some degrees. The same is applied to the carbon content, the total of the boron content and the carbon content, the ratio of the silicon content to the total of the silicon content and the content of the metal element and the like.

The present application contains subject matter related to that disclosed in Japanese Priority Patent Application JP 2008-162754 filed in the Japanese Patent Office on Jun. 23, 2008, the entire content of which is hereby incorporated by reference.

It should be understood by those skilled in the art that various modifications, combinations, sub-combinations and alternations may occur depending on design requirements and other factors insofar as they are within the scope of the appended claims or the equivalents thereof.

What is claimed is:

1. An anode active material comprising silicon (Si), boron (B), carbon (C), and one or more of metal elements selected from the group consisting of cobalt (Co), titanium (Ti) and iron (Fe),
    wherein,
        a boron content is from and including 4.9 mass % to 19.8 mass %,
        a carbon content is from and including 4.9 mass % to 19.8 mass %,
        a total of the boron content and the carbon content is from and including 9.8 mass % to 29.8 mass %,
        a ratio of a silicon content to the total of the silicon content and a content of the metal element (Si/(Si+M)) is from and including 70 mass % to 95 mass %, and
        a reaction phase whose half-width of a diffraction peak obtained by X-ray diffraction is 1 degree or more is included and the anode active material is capable of reacting with an electrode reactant.

2. The anode active material according to claim 1, wherein the electrode reactant is lithium (Li).

3. A secondary battery comprising:
    a cathode;
    an anode; and
    an electrolyte,
    wherein,
        the anode includes an anode active material which comprises silicon, boron, carbon, and one or more of metal elements selected from the group consisting of cobalt, titanium and iron, as an element,
        in the anode active material, (a) a boron content is from and including 4.9 mass % to 19.8 mass %, (b) a carbon content is from and including 4.9 mass % to 19.8 mass %, and (c) a total of the boron content and the carbon content is from and including 9.8 mass % to 29.8 mass %,
        a ratio of a silicon content to the total of the silicon content and a content of metal element is from and including 70 mass % to 95 mass %, and
        a reaction phase whose half-width of a diffraction peak obtained by X-ray diffraction is 1 degree or more is included and the anode active material is capable of reacting with an electrode reactant.

4. The secondary battery according to claim 3, wherein the electrode reactant is lithium.

5. The secondary battery according to claim 3, wherein the electrolyte comprises a cyclic ester carbonate derivative containing halogen as an element selected from the group consisting of:

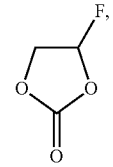

Chemical formula 1

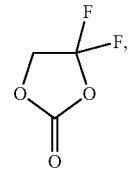

Chemical formula 2

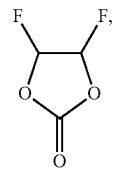

Chemical formula 3

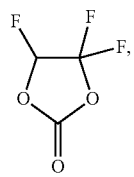

Chemical formula 4

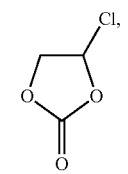

Chemical formula 5

-continued
Chemical formula 6
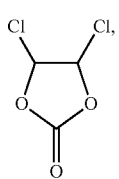
Chemical formula 7
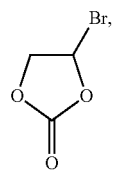
Chemical formula 8
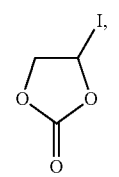
-continued
Chemical formula 9
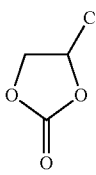 and
Chemical formula 10
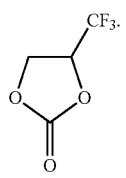
6. The secondary battery according to claim 5, wherein a content of the cyclic ester carbonate derivative is from and including 0.1 mass % to 80 mass %.
* * * * *